US010140775B2

(12) United States Patent
Oba et al.

(10) Patent No.: US 10,140,775 B2
(45) Date of Patent: Nov. 27, 2018

(54) IMAGE PROCESSING APPARATUS, IMAGE PROCESSING METHOD, AND PROGRAM

(71) Applicant: SONY CORPORATION, Tokyo (JP)

(72) Inventors: Eiji Oba, Tokyo (JP); Ken Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 14/917,711

(22) PCT Filed: Nov. 27, 2014

(86) PCT No.: PCT/JP2014/005932
§ 371 (c)(1),
(2) Date: Mar. 9, 2016

(87) PCT Pub. No.: WO2015/092981
PCT Pub. Date: Jun. 25, 2015

(65) Prior Publication Data
US 2016/0217625 A1 Jul. 28, 2016

(30) Foreign Application Priority Data
Dec. 16, 2013 (JP) ................. 2013-259593

(51) Int. Cl.
G06T 19/20 (2011.01)
B60R 1/00 (2006.01)
G06T 3/40 (2006.01)
(52) U.S. Cl.
CPC ............... G06T 19/20 (2013.01); B60R 1/00 (2013.01); G06T 3/4038 (2013.01);
(Continued)

(58) Field of Classification Search
CPC ............... B60R 1/00; B60R 2300/107; B60R 2300/303; B60R 2300/607;
(Continued)

(56) References Cited

U.S. PATENT DOCUMENTS

2003/0076414 A1 4/2003 Sato et al.
2006/0029255 A1* 2/2006 Ozaki ................. B60R 1/00
382/104

(Continued)

FOREIGN PATENT DOCUMENTS

EP 1 291 668 A2 3/2003
EP 1 775 952 A2 4/2007
(Continued)

OTHER PUBLICATIONS

International Search Report dated Mar. 10, 2015 in PCT/JP2014/005932.
(Continued)

Primary Examiner — Kim Vu
Assistant Examiner — Michael Vanchy, Jr.
(74) Attorney, Agent, or Firm — Xsensus LLP

(57) ABSTRACT

An image processing apparatus circuitry receives first image data from a first image capture device of an area adjacent to an automobile and also receives second image data from a second image capture device of the adjacent area. The circuitry combines the first image data with the second image data to form composite image data of a junction region of the at least a portion of the adjacent area. The circuitry changes over time respective image areas taken from the first image capture device and second image capture device to form the composite image data of the junction region.

16 Claims, 29 Drawing Sheets

(52) U.S. Cl.
CPC ... *B60R 2300/107* (2013.01); *B60R 2300/303* (2013.01); *B60R 2300/607* (2013.01); *G06T 2207/10021* (2013.01); *G06T 2207/20221* (2013.01); *G06T 2207/30252* (2013.01)

(58) Field of Classification Search
CPC .......... B60R 2300/105; B60R 2300/70; B60R 2300/8093; G06T 19/20; G06T 2207/10021; G06T 2207/20221; G06T 2207/30252; G06T 3/4038; G06T 5/006; H04N 7/181; H04N 5/23238; H04N 5/3572; G01S 11/12; G01S 17/936; G06K 9/00791
See application file for complete search history.

(56) References Cited

U.S. PATENT DOCUMENTS

| | | | | |
|---|---|---|---|---|
| 2006/0193509 | A1* | 8/2006 | Criminisi | G06K 9/00241 382/154 |
| 2007/0085901 | A1 | 4/2007 | Yang et al. | |
| 2009/0303401 | A1* | 12/2009 | Roosendaal | B60K 35/00 349/15 |
| 2010/0220190 | A1 | 9/2010 | Hiroshi | |
| 2010/0259372 | A1 | 10/2010 | Hideshiro | |
| 2013/0321628 | A1* | 12/2013 | Eng | B60R 1/00 348/148 |
| 2014/0152827 | A1 | 6/2014 | Yamamoto et al. | |
| 2014/0320658 | A1* | 10/2014 | Pliefke | B60R 1/002 348/148 |

FOREIGN PATENT DOCUMENTS

| | | |
|---|---|---|
| JP | 2003-30833 A | 1/2003 |
| JP | 2006-121587 A | 5/2006 |
| JP | 2007-109166 A | 4/2007 |
| JP | 2007-261463 A | 10/2007 |
| JP | 2009-77022 A | 4/2009 |
| JP | 2013-30833 A | 2/2013 |
| WO | WO 2007/129582 A1 | 11/2007 |

OTHER PUBLICATIONS

Office Action dated Feb. 14, 2017 in Japanese Patent Application No. 2013-259593 (with English translation).
Communication Pursuant to Article 94(3) EPC dated Sep. 27, 2018 in EP Application No. 14 812 308.6.

* cited by examiner

FIG. 1
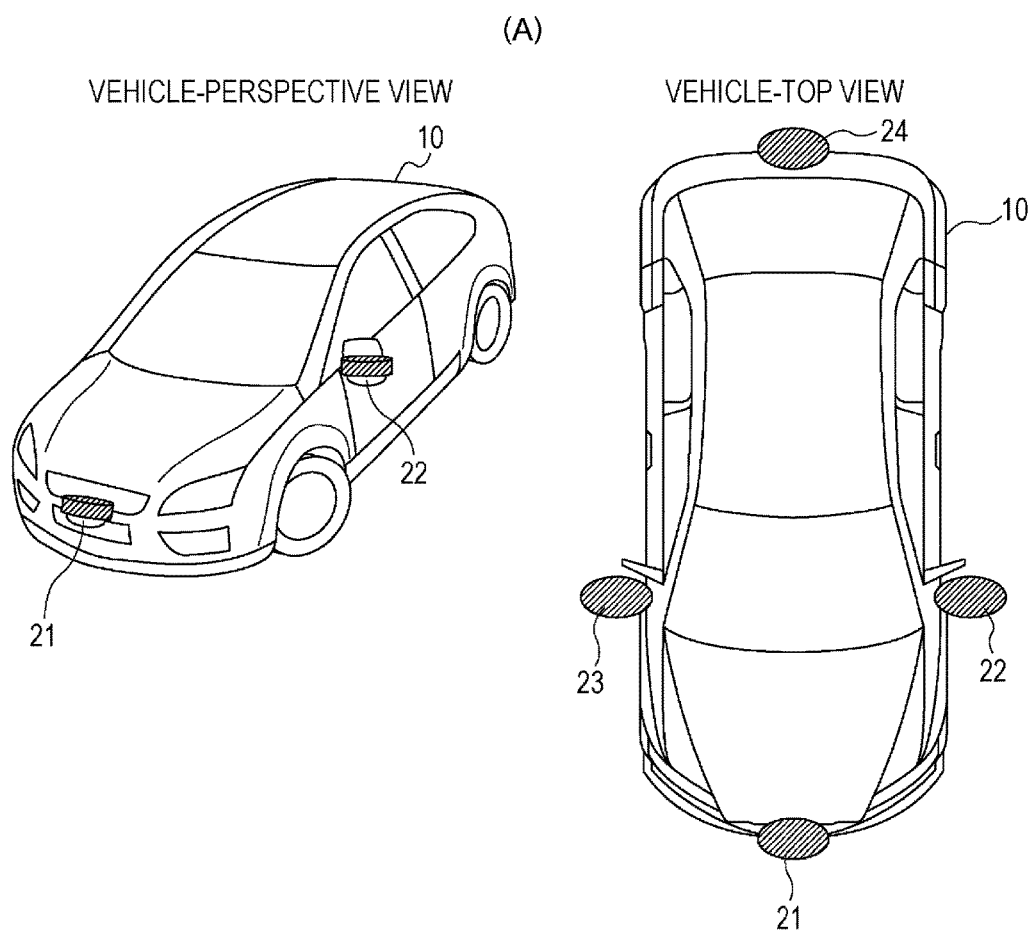
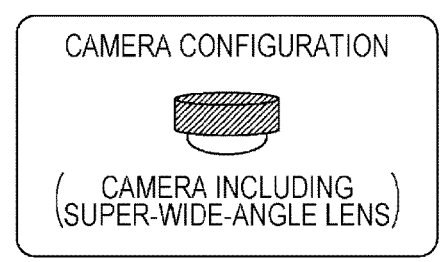

FIG. 2
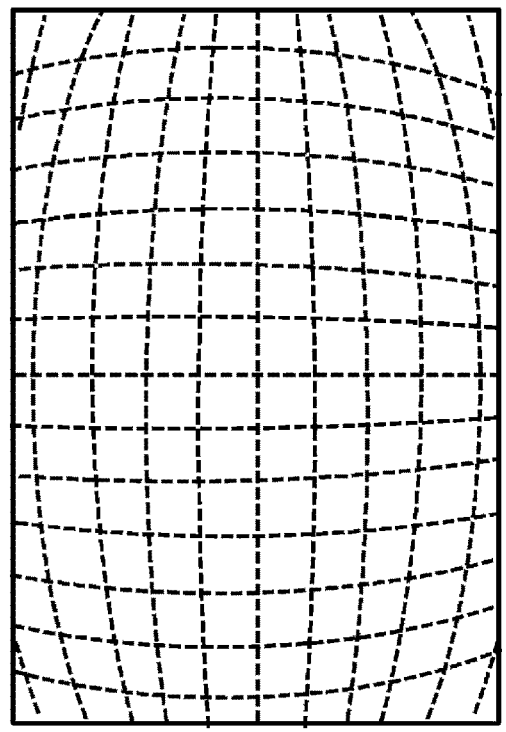
(b) CAPTURED IMAGE
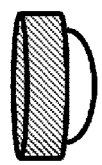
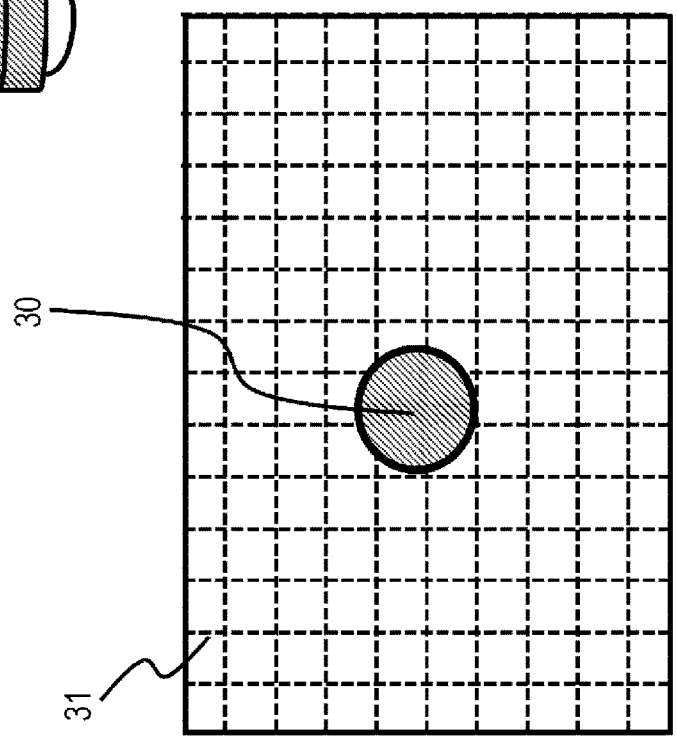
(a) IMAGE CAPTURING ENVIRONMENT FIG. 5
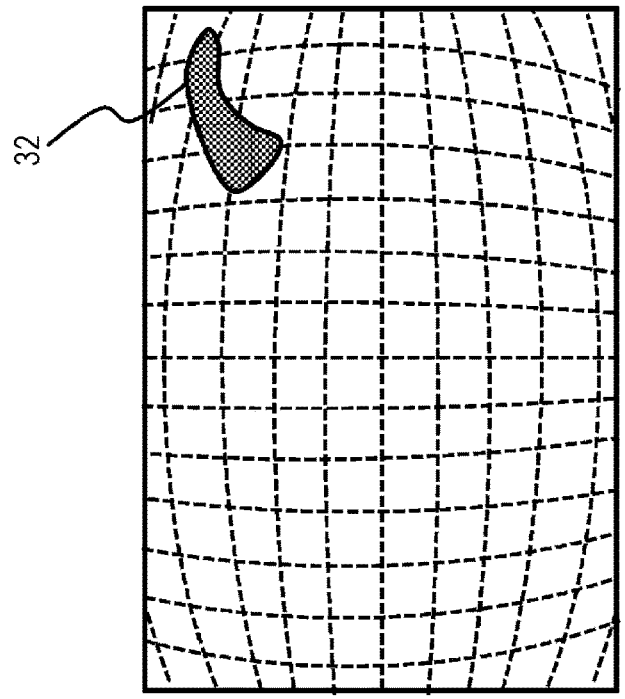
(a) IMAGE CAPTURING ENVIRONMENT
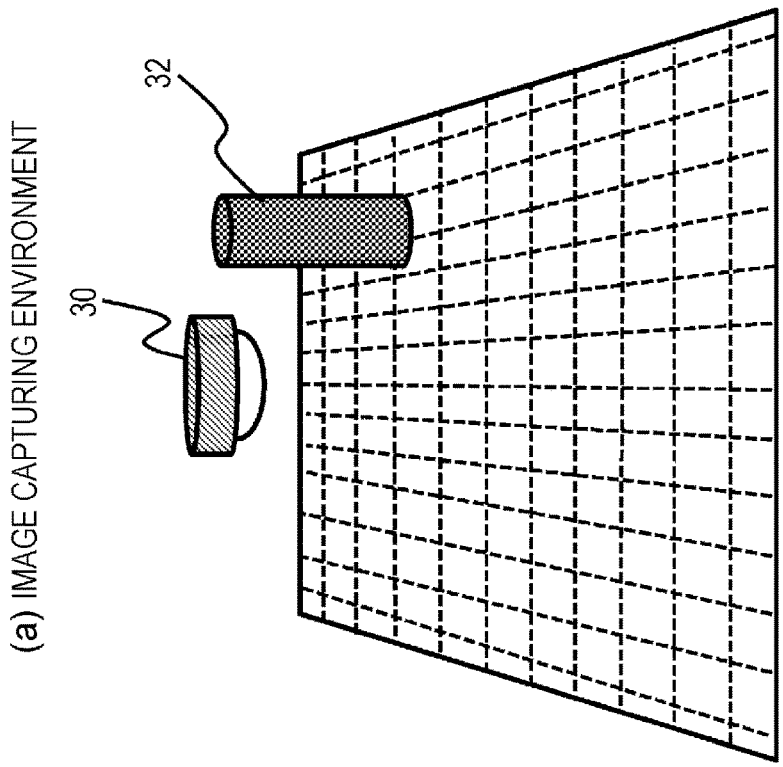
(b) CAPTURED IMAGE

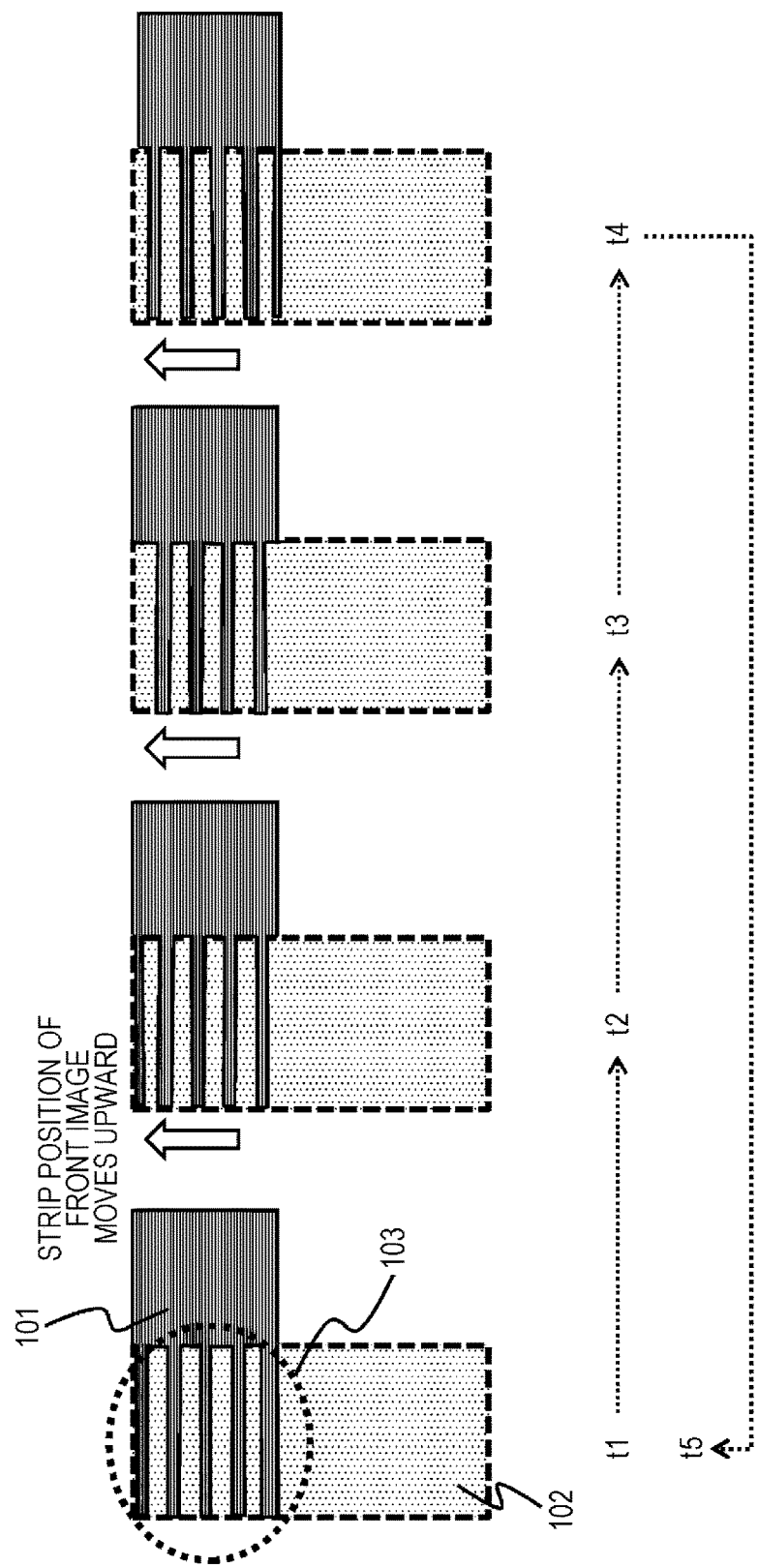

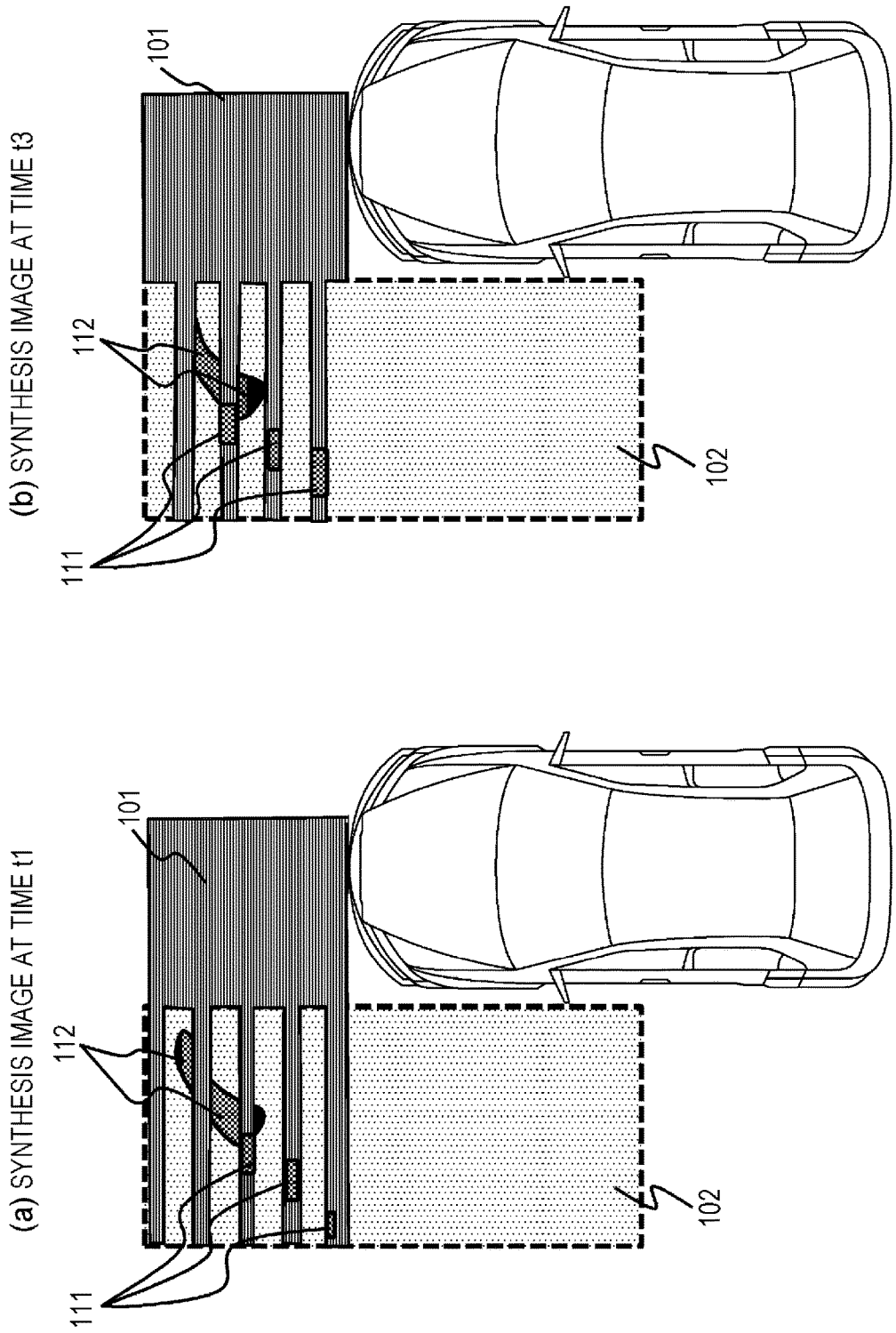

FIG. 14

| PARAMETER | CONTENTS |
|---|---|
| i | STRIP IDENTIFIER, STRIP IDENTIFIER OF ANY ONE IMAGE (IN THIS EXAMPLE, FRONT [f] IMAGE) OF JUNCTION REGION, BUT FIRST STRIP IDENTIFIER i=0 |
| j | LINE IDENTIFIER OF IMAGE FORMATION PIXEL, LINE IDENTIFIER FROM EACH STRIP STARTING POSITION OF ANY ONE IMAGE (IN THIS EXAMPLE, FRONT [f] IMAGE) OF JUNCTION REGION, BUT LINE j OF EACH STRIP STARTING POSITION=0 |
| ZN | STRIP NUMBER SPECIFICATION VALUE, MAXIMUM VALUE OF STRIP IDENTIFIER (i) CAPABLE OF BEING SET IN JUNCTION REGION OF IMAGE (IN THIS EXAMPLE, FRONT [f] IMAGE) IN WHICH STRIP IDENTIFIER i IS SET |
| Wf | STRIP WIDTH SPECIFICATION VALUE, MAXIMUM VALUE OF LINE IDENTIFIER (j) WHICH IS EQUIVALENT TO WIDTH OF ONE STRIP OF IMAGE (IN THIS EXAMPLE, FRONT [f] IMAGE) IN WHICH STRIP IDENTIFIER i IS SET |
| Ws | STRIP WIDTH SPECIFICATION VALUE, NUMBER OF LINES EQUIVALENT TO STRIP WIDTH OF THE OTHER IMAGE (IN THIS EXAMPLE, LEFT SIDE [s] IMAGE) WHICH IS IMAGE (IN THIS EXAMPLE, FRONT [f] IMAGE) IN WHICH STRIP IDENTIFIER i IS NOT SET |
| Wf+Ws | ALTERNATE DISPLAY STRIP INTERVAL SPECIFICATION VALUE IN JUNCTION REGION, NUMBER OF LINES EQUIVALENT TO STRIP INTERVAL OF IMAGE (IN THIS EXAMPLE, FRONT [f] IMAGE) IN WHICH STRIP IDENTIFIER i IS SET |
| SW | GRIP SHIFT WIDTH SPECIFICATION VALUE, NUMBER OF STRIP SHIFT LINES PER UNIT FRAME OF IMAGE (IN THIS EXAMPLE, FRONT [f] IMAGE) IN WHICH STRIP IDENTIFIER i IS SET |
| f | DISPLAY FRAME IDENTIFIER |

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2013-259593 filed Dec. 16, 2013, the entire contents of which are incorporated herein by reference.

TECHNICAL FIELD

The present disclosure relates to an image processing apparatus, an image processing method, and a program. Specifically, for example, the present disclosure relates to an image processing apparatus that synthesizes images captured by a plurality of cameras mounted on a vehicle and generates the same images as observed from above the vehicle, and an image processing method and a program.

BACKGROUND ART

When states of right front, sides, back, or the like of a vehicle in a traveling direction are not directly visible from a driver's seat, there is a danger that the vehicle may crash into a hidden obstacle which is located in the traveling direction. A system for avoiding such a danger includes a driving assistance system that synthesizes images captured by a plurality of wide-angle cameras mounted on the front, back, and lateral sides of a vehicle, generates a virtual image observed from above the vehicle, and displays the image on a display unit provided at a driver's seat.

Meanwhile, the image observed from above the vehicle is referred to as an "around-view image", an "overhead image", a "birds-eye image", or the like. Hereinafter, in this specification, a description will be given on the assumption that the image observed from above the vehicle is an "overhead image".

In such a system, the camera installed in the vicinity of the vehicle is desired to capture an image having a region as wide as possible at close range, and thus includes a wide-angle lens such as, for example, a fish-eye lens. The camera can capture an image having a wide region by using the wide-angle lens. However, image distortion occurs in the image captured using the wide-angle lens. In particular, there is a problem in that a large amount of distortion occurs in a region in the vicinity of the image.

A general driving assistance system of the related art is configured to execute distortion correction of a captured image, to generate an "overhead image" viewed from above a vehicle as a corrected image, and to output the generated image to a display unit.

Meanwhile, an image correction process for generating the overhead image is referred to as "overhead conversion".

However, positions at which cameras are mounted on a vehicle include a front, a rear, sides, and the like of the vehicle. A range in which each camera is capable of capturing an image is limited to any one region of front, back, right, and left regions of the vehicle. Accordingly, in order to generate an overhead image including an all-around image of the vehicle, it is necessary to execute a synthesis process of joining the overhead images which are generated on the basis of images captured by a plurality of cameras located at different positions.

However, when the synthesis process is performed of joining a plurality of overhead images which are generated by performing overhead conversion on images captured using a wide-angle lens, subjects in junction regions between the plurality of images may be erased without remaining in a synthesis image. This is because distortion correction is performed using the ground as a reference plane. For example, when there is a subject (stereoscopic object) which is located at a higher position than the reference plane, the subject is pressed out of a boundary of a junction between the images after overhead conversion, and thus may not remain in the synthesis image.

For example, it is assumed that a stereoscopic object X extending upwards from the ground, which is equivalent to the reference plane in the overhead conversion, is captured in the vicinity of substantially a boundary of each of two of an image A and an image B which are objects to be synthesized.

When a synthesis image is generated by joining corrected images (overhead images) obtained by performing overhead conversion on the image A and the image B, a junction region between the image A and the image B is subjected to a joining process in which a correspondence position of the ground which is the reference plane of the overhead conversion is set to a junction line. The process of joining the images A and B is performed by cutting off an image outside the junction line between the images A and B.

When such a joining process is performed, a situation may occur where the stereoscopic object X captured in the image A is set to the outside of the junction line of the image A, that is, the region cut off from the image A. On the other hand, the stereoscopic object X captured in the image B is also set to the outside of the junction line of the image B, that is, the region cut off from the image B.

As a result, the stereoscopic object X in the vicinity of the boundary between the images A and B does not remain in the synthesis image. That is, it is not possible to confirm if the stereoscopic object X, which is an originally-existing subject, is in the synthesis image.

A technique of the related art for solving such a problem is PTL 1 (Japanese Unexamined Patent Application Publication No. 2007-109166). PTL 1 discloses a configuration in which images captured by imaging devices mounted on the periphery of a vehicle are synthesized by overhead conversion so that a synthesis image viewed from above the vehicle is generated and displayed. PTL 1 discloses a configuration in which two corrected images are alternately displayed in a comb shape in a region where two overhead images as objects to be synthesized overlap each other.

A subject pressed out of the image by overhead conversion accompanied by distortion correction is displayed in the comb-shaped display region. Thus, a driver who is an image observer can confirm that some kind of object is present in the region, and can pay attention to the object.

PTL 1 discloses a configuration in which a region having two overhead images overlapping each other is displayed in a fixed pattern in which the two overhead images are alternately set in a comb shape. However, in overhead conversion using a ground plane as a reference plane, the conversion is not correctly performed on a stereoscopic object displayed in the comb-shaped display region. Thus, distortion remains, and the original shape is not restored. In addition, since the display is disconnected due to the two images being displayed in a comb shape, it may be difficult to cause an observer (driver) to recognize the presence of a stereoscopic object having a possibility of collision.

CITATION LIST

Patent Literature

PTL 1: Japanese Unexamined Patent Application Publication No. 2007-109166

SUMMARY

Technical Problem

It is desirable to provide an image processing apparatus that generates a synthesis image, which is generated by a process of synthesizing a plurality of images captured using a wide-angle lens, as an image capable of easily recognizing a real subject, and displays the image, and an image processing method and a program.

Solution to Problem

An image processing apparatus having circuitry that receives first image data from a first image capture device of an area adjacent to an automobile and also receives second image data from a second image capture device of the adjacent area. The circuitry combines the first image data with the second image data to form composite image data of a junction region of the at least a portion of the adjacent area. The circuitry changes over time respective image areas taken from the first image capture device and second image capture device to form the composite image data of the junction region.

According to another aspect there is described an automobile image processing system including:

a first image capture device mounted to a front of an automobile and configured to capture first image data with a forward looking perspective with respect to a driver seat in the automobile;

a second image device mounted to a side of the automobile and configured to capture second image data with a side looking perspective with respect to the driver seat in the automobile, and circuitry configured to receive the first image data, receive the second image data, combine the first image data with the second image data to form composite image data of a junction region between the first image data and the second image data, and change over time respective image areas taken from the first image capture device and second image capture device to form the composite image data of the junction region, wherein the composite image data of the junction region provides at least a portion of an overhead view of the automobile.

According to another aspect, there is described a vehicle monitoring system comprising:

a first image capture device mounted to a front of the automobile and configured to capture first image data with a forward looking perspective with respect to a driver seat in the automobile;

a second image device mounted to a side of the automobile and configured to capture second image data with a side looking perspective with respect to the driver seat in the automobile;

circuitry configured to
 receive the first image data,
 receive the second image data,
 combine the first image data with the second image data to form composite image data of a junction region between the first image data and the second image data, and
 change over time respective image areas taken from the first image capture device and second image capture device to form the composite image data of the junction region, wherein the composite image data of the junction region provides at least a portion of an overhead view of the automobile; and a display that is mounted to an interior of the automobile and is configured to display the overhead view of the automobile including the junction region.

Advantageous Effects of Invention

According to a configuration of an embodiment of the present disclosure, it is possible to generate and display an image viewed from above a vehicle, the image making it easy to recognize a stereoscopic object.

Specifically, a plurality of overhead images are generated by individually correcting images captured by a plurality of cameras disposed at different positions of a vehicle such as front, back, right, and left sides, and a synthesis image is generated by joining the plurality of generated overhead images to each other. An image processing unit generates a synthesis image having a junction region which is set such that display regions of a plurality of overhead images to be joined change with a change in time. For example, a first image and a second image, which are to be joined to each other, are alternately set in a strip shape, and a synthesis image is generated having a junction region which is set such that the position of a strip changes with a change in time.

With this configuration, it is possible to generate and display an image viewed from above a vehicle, the image making it easy to recognize a stereoscopic object.

Meanwhile, the effects described in this specification are just examples, and additional effects may be added.

BRIEF DESCRIPTION OF DRAWINGS

FIG. 1 is a diagram illustrating an example in which cameras are mounted on a vehicle.

FIG. 2 is a diagram illustrating an example of an image captured using a wide-angle lens.

FIG. 5 is a diagram illustrating an example of an image captured using a wide-angle lens in a case where the image includes a stereoscopic object as a subject.

FIG. 12 is a diagram illustrating an example in which a display mode changes with a change in time in a junction region of a synthesis image according to an embodiment of the present disclosure.

FIG. 13 is a diagram illustrating an embodiment in which a stereoscopic object is displayed in a junction region of a synthesis image according to an example of the present disclosure.

FIG. 14 is a diagram illustrating parameters applied to a display control of a synthesis image according to an embodiment of the present disclosure.

DESCRIPTION OF EMBODIMENTS

Figure 3:
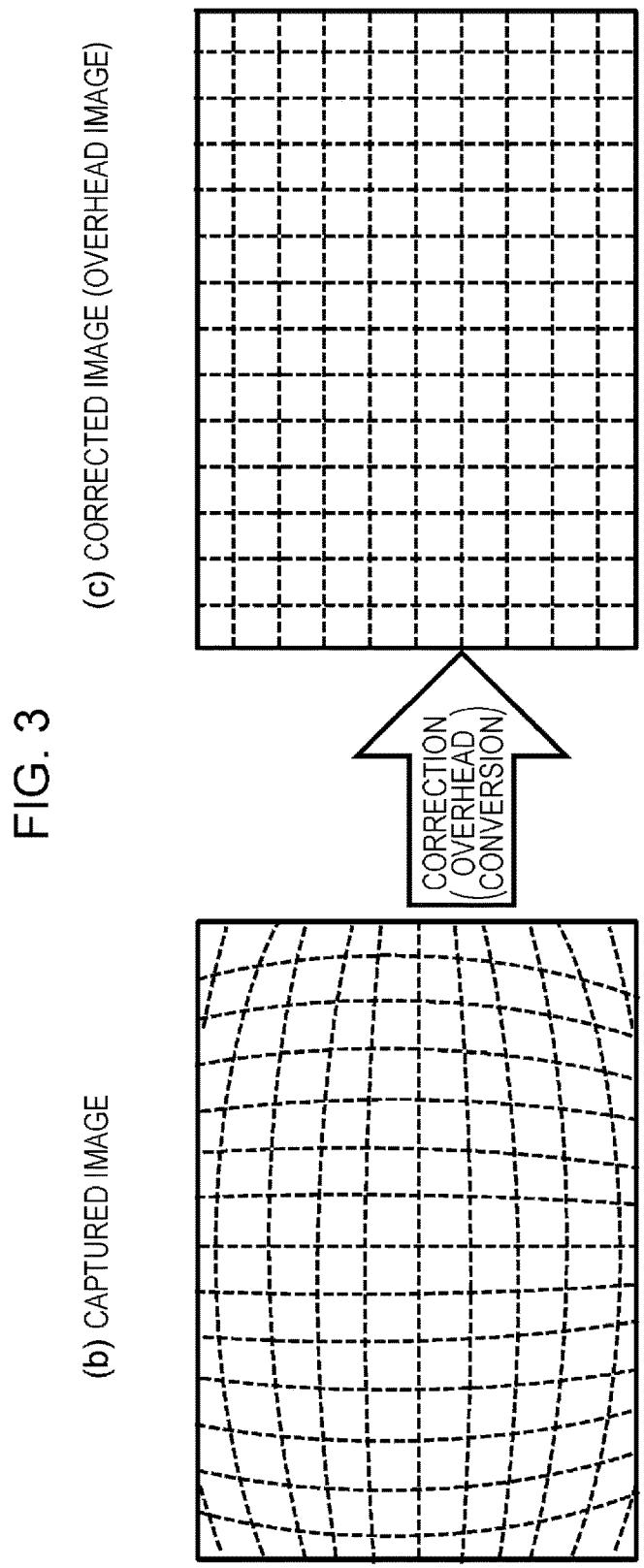
FIG. 3 is a diagram illustrating overhead conversion which is an example of correction of an image captured using a wide-angle lens.

Hereinafter, an image processing apparatus, an image processing method, and a program of the present disclosure will be described in detail with reference to the accompanying drawings. Meanwhile, a description will be given in accordance with the following items.

1. Regarding outlines of overhead conversion process and process of generating synthesis image, and example in which stereoscopic object disappears 2. Regarding embodiment in which display regions of images are dynamically changed in junction region of image to be synthesized 3. Regarding display control sequence in junction region of image 4. Regarding example of process of highlighting specific object displayed in junction region 5. Regarding example in which display mode changes in junction region 5-1. Embodiment in which curved strip type display regions are alternately set (second embodiment)

5-2. Embodiment in which image boundary of junction region is moved (third embodiment)

6. Regarding auxiliary information used when generating synthesis image

7. Regarding example of hardware configuration of image processing apparatus

8. Conclusion of configuration of the present disclosure

<1. Regarding Outlines of Overhead Conversion Process and Process of Generating Synthesis Image, and Example in which Stereoscopic Object Disappears>

First, a description will be given of an outline of a process of performing overhead conversion on each of images captured by cameras mounted at a plurality of locations of a vehicle such as front, back, right, and left sides and generating a synthesis image by joining the plurality of generated overhead images to each other, and a description will also be given of an example in which a stereoscopic object generated in this process disappears.

FIG. 1 is a diagram illustrating an example in which cameras are mounted on a vehicle.

As shown in FIG. 1(A), four cameras are mounted at positions of a vehicle 10 on the front, back, right, and left sides.

Four cameras, that is, a camera F21, a camera L22, a camera R23, and a camera B24 are mounted on the front, left, right, and back of the vehicle 10, respectively.

As shown in a camera configuration of FIG. 1(B), each of the cameras F21 to R24 is configured to include a wide-angle lens such as, for example, a fish-eye lens and to capture images of the ground and a stereoscopic object on the ground over a wide range by setting an imaging direction to a downward direction (ground direction).

Distortion occurs in the image captured using a wide-angle lens. An example of an image captured using a wide-angle lens will be described with reference to FIG. 2.

FIG. 2(a) shows an image capturing environment. A subject 31 is the ground on which a grid pattern is drawn. A wide-angle camera 30 is set on the top center of the subject 31 to perform image capturing.

The camera 30 is a camera having a wide-angle lens such as, for example, a fish-eye lens mounted thereon.

An example of an image captured in the image capturing environment shown in FIG. 2(a) is a captured image shown in FIG. 2(b).

As shown in the captured image of FIG. 2(b), the grid pattern of the ground on the captured image has curved distortion.

The distortion is distortion of an image which occurs due to image capturing using a wide-angle lens.

In order to generate an image having the same shape as a real subject by removing the distortion of the captured image shown in FIG. 2(b), it is necessary to perform image correction, that is, overhead conversion.

An example of this correction process will be described below with reference to FIG. 3.

FIG. 3 shows a captured image which is the same as that in FIG. 2(b) and a corrected image (overhead image) generated by a correction process (overhead conversion) of the captured image, respectively.

Meanwhile, an image observed from above is referred to as an "overhead image", and an image correction process of performing conversion to an "overhead image" is referred to as "overhead conversion". The corrected image shown in FIG. 3(c) is an "overhead image", and a correction process of generating the corrected image from the captured image of FIG. 3(b) is equivalent to "overhead conversion".

The corrected image (overhead image) of FIG. 3(c) is an image having the same grid pattern as that of the subject 31 in the above-described image capturing environment of FIG. 2(a) and is a correct overhead image viewed from above the ground, and the grid pattern of the ground is a pattern in which the shape of a real subject is restored.

Figure 4:
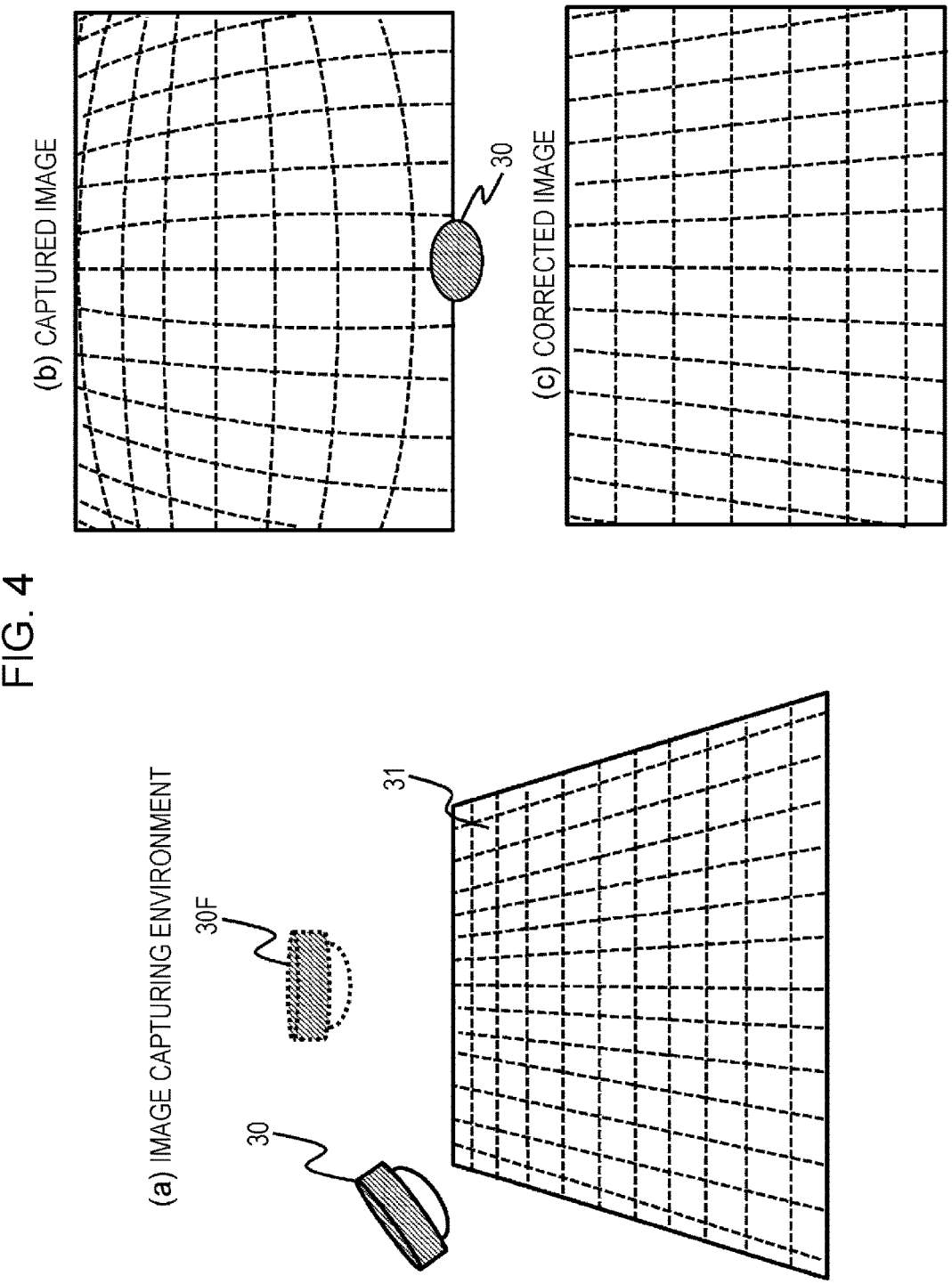
FIG. 4 is a diagram illustrating overhead conversion which is an example of correction of an image captured using a wide-angle lens.

FIG. 4 is a diagram illustrating an example of a process of correcting an image captured by a wide-angle camera, such as a fish-eye camera, which is mounted toward an obliquely downward direction. As shown in FIG. 4(a), an image of the ground on which a grid pattern is drawn is captured as the subject 31 by the wide-angle camera 30 mounted toward the obliquely downward direction. FIGS. 4(b) and 4(c) show a captured image captured in an image capturing environment shown in FIG. 4(a) and a corrected image, respectively.

A so-called distortion-corrected image, which is converted to a center captured image by removing fish-eye distortion of the image shown in FIG. 4(b), is the corrected image shown in FIG. 4(c).

In a distortion correction process in the example shown in FIG. 4, a trapezoid of the subject 31 (ground on which a tetragonal grid pattern is drawn) is obtained from a series of images, shown in FIG. 4(b), captured from an oblique position of the wide-angle camera 30, reflecting a perspective by performing a fish-eye distortion correction process.

In other words, at the time of the distortion correction process, a trapezoid image shown in FIG. 4(c) is obtained in which curved distortion of the captured image is removed and a perspective remains.

It is possible to perform a process of performing conversion to a captured image from the position of a virtual camera 30F right above the subject 31 by removing the trapezoid distortion remaining in FIG. 4(c) to shift to a virtual camera point. This series of processes is performed as an integrated process, and thus an overhead image of the ground which is viewed from oblique information is obtained.

Meanwhile, hereinafter, the above-described integrated conversion process in which the distortion conversion of the image viewed from the oblique direction is combined with the overhead conversion will be collectively referred to as "overhead conversion". In this manner, the overhead conversion serves as a process including a process of converting an image viewed obliquely from above to an image viewed from above. However, a description of the process in which the image is viewed from the oblique direction will be omitted below.

The overhead conversion as shown in FIG. 3 is performed using a certain horizontal plane as a reference plane. FIG. 3 shows the example of a conversion process performed using the ground on which a grid pattern is drawn, as a reference plane, and the grid pattern drawn on the ground is restored with a high level of accuracy.

However, overhead conversion in which one reference plane is set has a problem that a subject other than the reference plane is projected on a position different from the installation point thereof.

This problem will be described below with reference to FIGS. 5 and 6.

Similarly to the above description given with reference to FIG. 2, FIG. 5 shows an image capturing environment and a captured image, respectively.

Similarly to FIG. 2(a), the image capturing environment of FIG. 2(a) includes the ground on which a grid pattern is drawn. However, a stereoscopic object 32 extending upwards from the ground is set.

The wide-angle camera 30 is installed at a finite distance on the ground, and is set toward the ground.

Similarly to the above description given with reference to FIG. 2(b), in the captured image of FIG. 2(b), distortion occurs in the grid pattern of the ground. Further, an image of the stereoscopic object 32 is also captured in a distorted state.

Meanwhile, the drawing is a schematic diagram, and the distortion of the stereoscopic object 32 changes in various ways depending on the position and height thereof.

Figure 6:
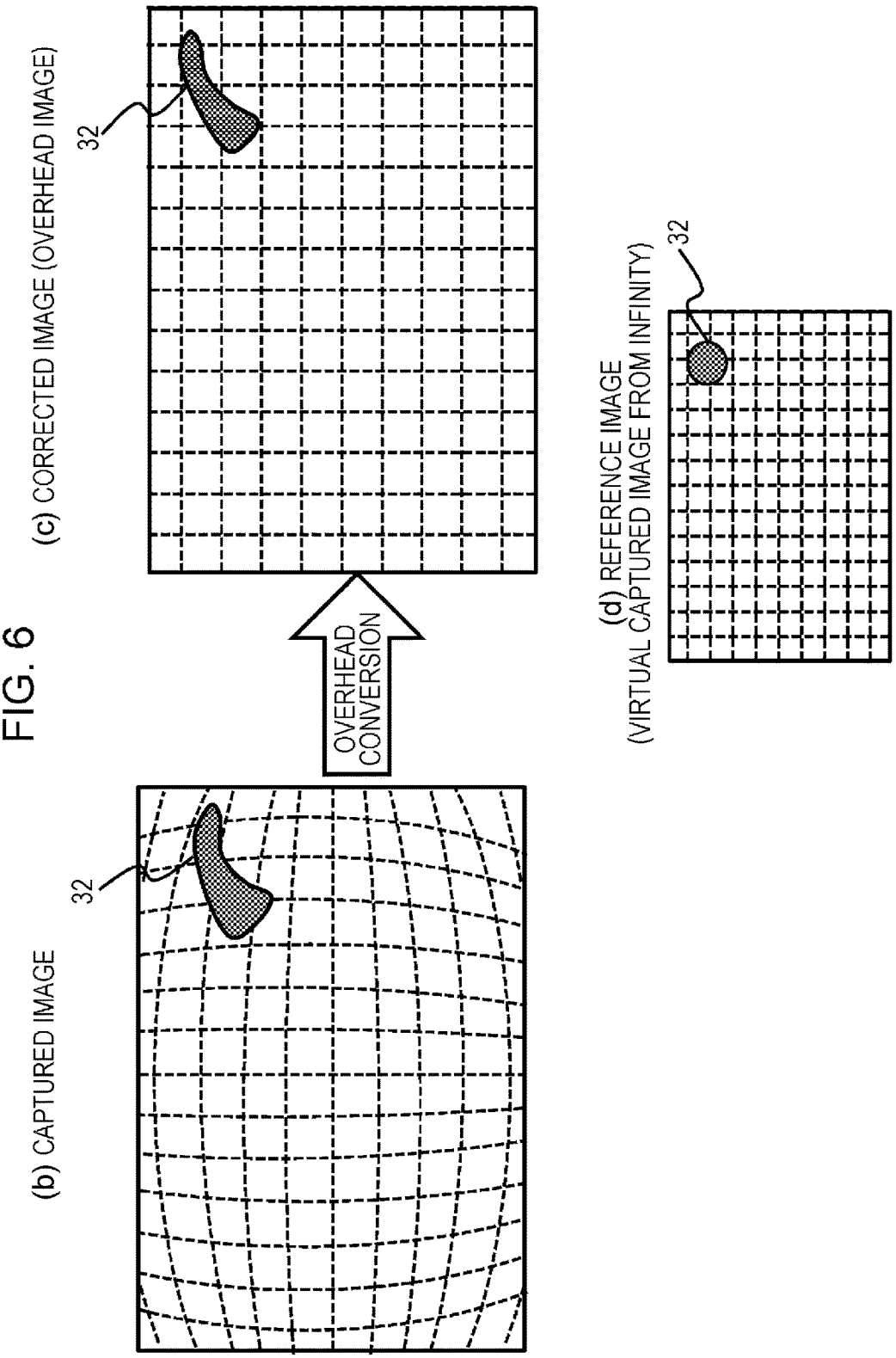
FIG. 6 is an example of correction of an image captured using a wide-angle lens, and is a diagram illustrating overhead conversion in a case where the image includes a stereoscopic object as a subject.

FIG. 6 is a diagram showing an example of a process of correcting a captured image of FIG. 6(b), that is, an overhead conversion process in which a ground plane is used as a reference plane.

As shown in a corrected image (overhead image) of FIG. 6(c), the grid pattern of the ground is clearly corrected. However, the distortion of the stereoscopic object 32 remains, and thus the stereoscopic object is displayed by being changed to a shape different from the real shape observed.

A reference image shown in FIG. 6(d) is an example of an overhead image which is ideally observed from infinity. In this image, the stereoscopic object 32 is observed from directly above.

Meanwhile, FIG. 6 is a schematic diagram, and distortion remaining in the stereoscopic object 32 by overhead conversion changes in various ways depending on the position and height thereof.

Next, reference will be made to FIGS. 7 and 8 to describe a process of generating a synthesis image by connecting images captured by a plurality of wide-angle cameras mounted on a vehicle.

Figure 7:
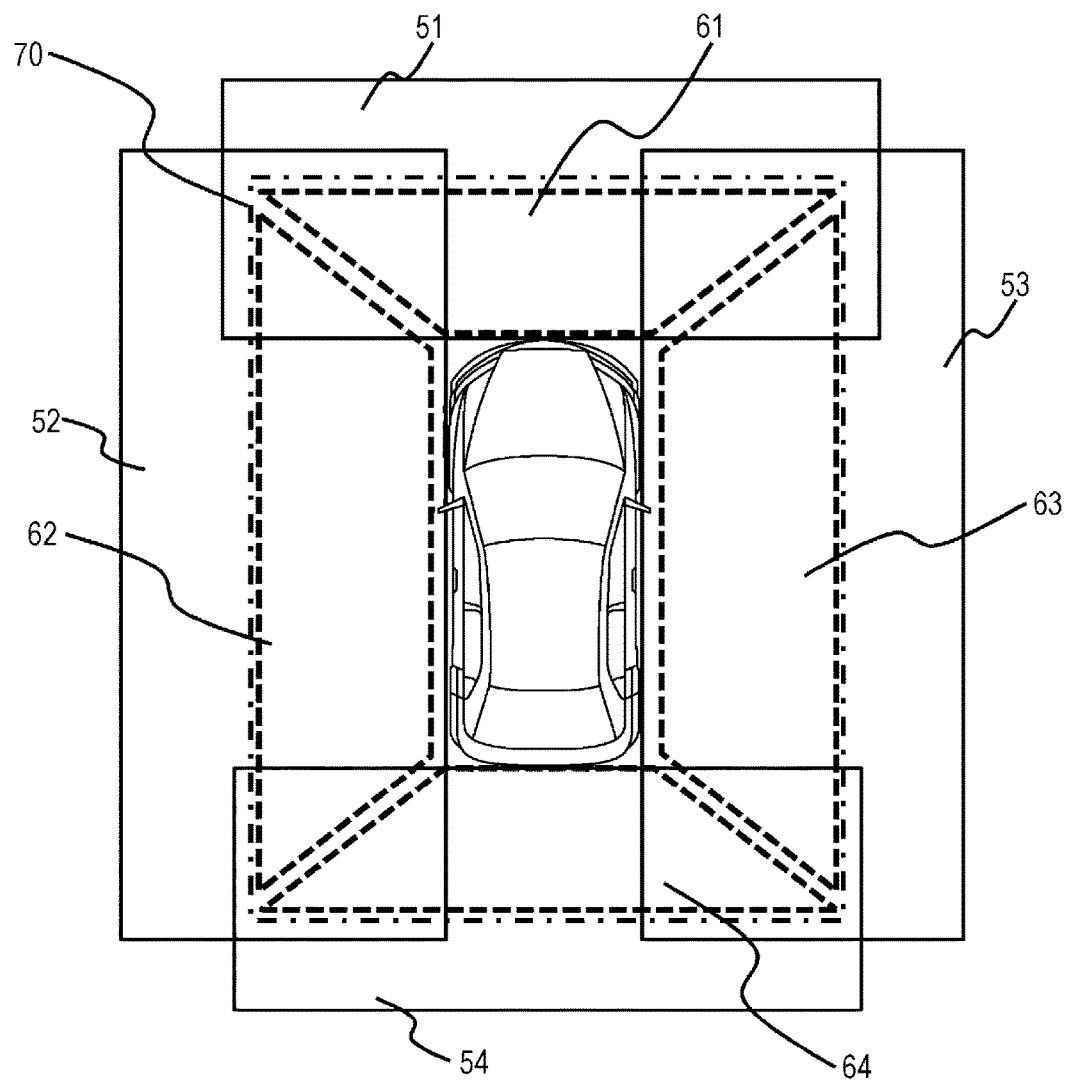
FIG. 7 is a diagram illustrating an example of a process of synthesizing a plurality of overhead images.

FIG. 7 is a diagram illustrating an example of image regions captured by four cameras mounted on four faces of front, rear, right, and left faces of the vehicle which are described above with reference to FIG. 1, and synthesis regions applied to generate a synthesis image.

A front image capturing region 51 shown in FIG. 7 shows a region captured by the camera F21 shown in FIG. 1. A left side image capturing region 52 shows a region captured by the camera L22, a right side image capturing region 53 shows a region captured by the camera R23, and a rear image capturing region 54 shows a region captured by the camera B24.

Four corrected images (overhead images) are generated by performing overhead conversion on these four captured images, and then the overhead images are joined to each other to form one synthesis image.

Four dotted-line trapezoid regions shown in FIG. 7 are regions (synthesis region) which are selected as components of a synthesis image 70 from the respective captured images.

The synthesis image 70 is generated by connecting the following four synthesis regions.

Four regions, that is, (a) a front image synthesis region 61 which is a portion of the front image capturing region 51, (b) a left side image synthesis region 62 which is a portion of the left side image capturing region 52, (c) a right side image synthesis region 63 which is a portion of the right side image capturing region 53, and (d) a rear image synthesis region 64 which is a portion of the rear image capturing region 54 are connected to each other to thereby complete one synthesis image 70.

Meanwhile, overhead conversion is performed on the images before the synthesis process. That is, four overhead images generated by performing the overhead conversion process are synthesized.

One synthesis image 70 is generated by the synthesis process.

Figure 8:
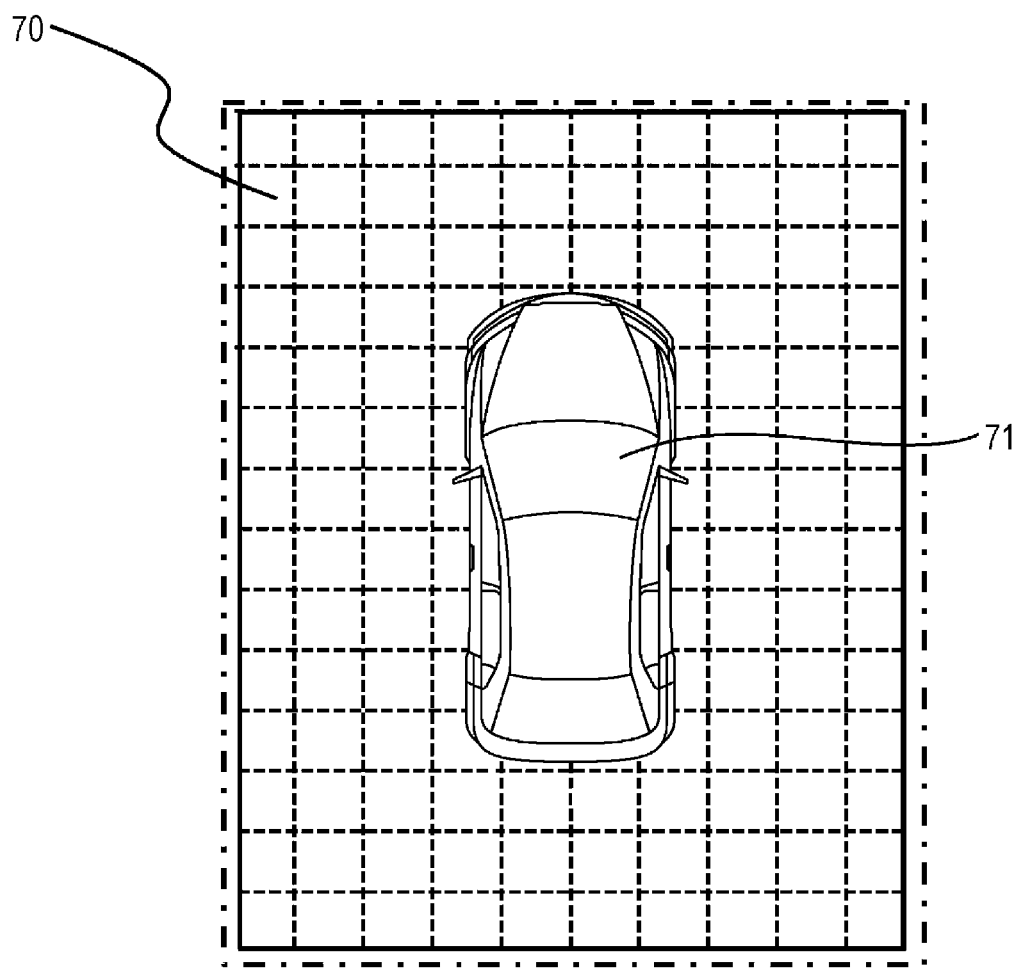
FIG. 8 is a diagram illustrating an example of a synthesis image.

FIG. 8 shows an example of the synthesis image 70. As shown in FIG. 8, the synthesis image 70 is equivalent to an image in which the ground in the vicinity of a vehicle is observed from above centering on a vehicle image 71.

Meanwhile, the vehicle image 71 is not an image captured by a camera, but is a pseudo image of a vehicle mounted on this system which is provided in advance.

A data processing unit generating an image to be output to a display unit provided at a driver's seat of the vehicle executes a process of attaching the vehicle image 71 to an image (overhead image) of the vehicle surroundings which is generated by performing overhead conversion and a synthesis process on an image captured by a camera to generate the images to be output and displays the image on the display unit.

A driver observes the image to ascertain a situation of the surroundings of the vehicle and to drive safely.

However, when a synthesis image in which a plurality of overhead images are connected to each other is generated, there is a problem in that subjects standing on the ground on a boundary between adjacent cameras are joined to each other and thus disappear from the overhead images.

As in the stereoscopic object 32 described above with reference to FIGS. 5 and 6, this occurs in a case where a subject (object) is present at a position different from a reference plane (ground) of overhead conversion.

Figure 9:
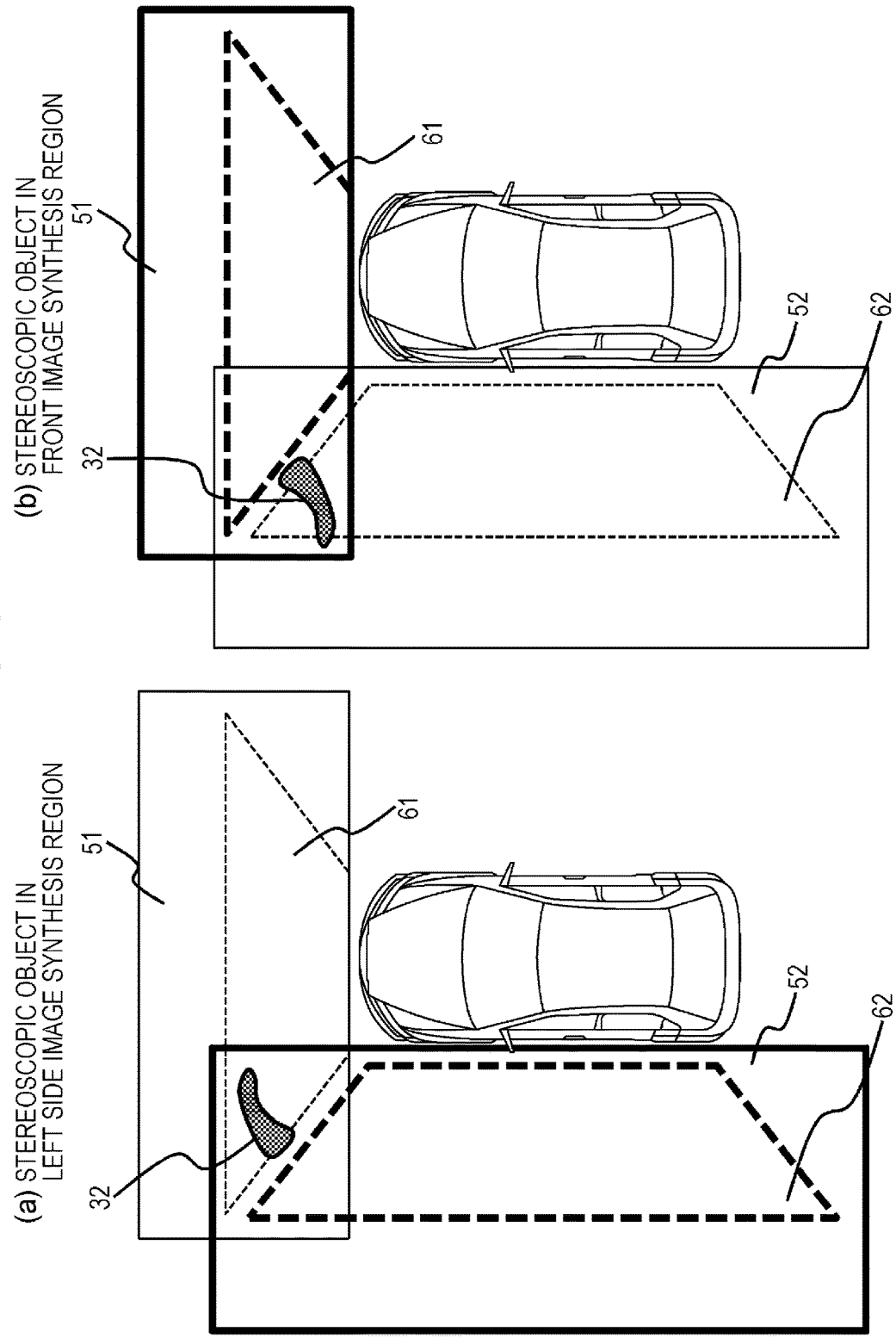
FIG. 9 is a diagram illustrating an example in which a stereoscopic object disappears from a synthesis image based on overhead images.

An example of the disappearance of the subject will be described below with reference to FIG. 9. FIG. 9 is a diagram showing an example of a process of synthesizing the front image synthesis region 61 and the left side image synthesis region 62.

FIG. 9(a) shows the position of the stereoscopic object 32 on an image obtained by performing overhead conversion on an image captured in the left side image capturing region 52 and the left side image synthesis region 62.

The overhead conversion image is equivalent to, for example, the corrected image (overhead image) which is described above with reference to FIG. 6(c).

As shown in FIG. 9(a), the stereoscopic object 32 is converted and projected onto a position shifted from the left side image synthesis region 62 having a trapezoid shape.

On the other hand, FIG. 9(b) shows the position of the stereoscopic object 32 on an image obtained by performing overhead conversion on an image captured in the front image capturing region 51 and the front image synthesis region 61.

As shown in FIG. 9(b), the stereoscopic object 32 is also converted and projected onto a position shifted from the front image synthesis region 61 having a trapezoid shape.

The left side image synthesis region 62 having a trapezoid shape and the front image synthesis region 61 having a trapezoid shape are joined to each other, and thus a final synthesis image is generated.

The resulting synthesis image does not include an image of the stereoscopic object 32 and disappears.

Figure 10:
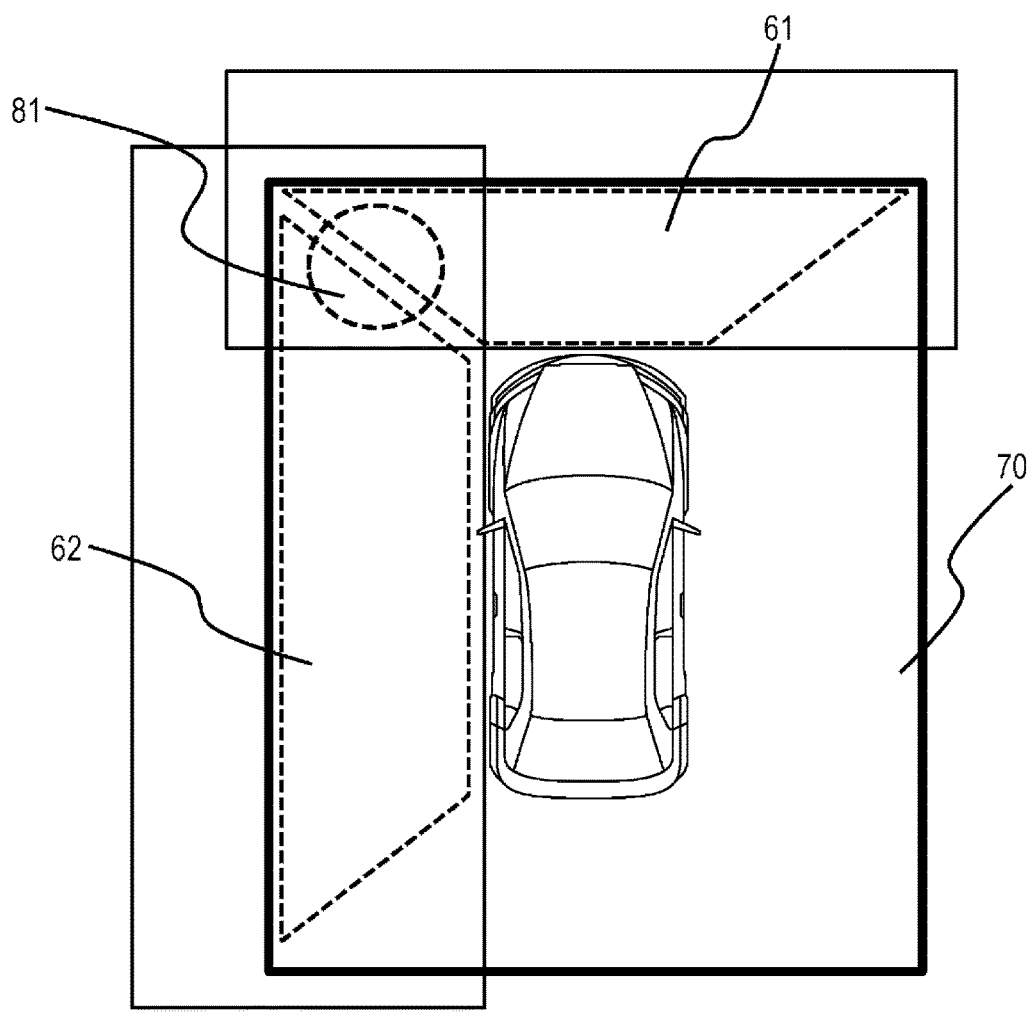
FIG. 10 is a diagram illustrating an example in which a stereoscopic object disappears from a synthesis image based on overhead images.

That is, as shown in FIG. 10, the stereoscopic object 32 is not included in a junction region 81 between a left side image and a front image of the synthesis image 70, and the synthesis image 70 in which the stereoscopic object 32 disappears is generated.

In this manner, when a process of generating and synthesizing a plurality of overhead images is based on a ground plane, a stereoscopic object present in a boundary region between the overhead images may disappear.

As a result, a stereoscopic object is not displayed in the synthesis image displayed on the display unit at the driver's seat. Thus, the driver is not able to recognize an obstacle, which results in a possibility of the driver driving dangerously.

<2. Regarding Embodiment in which Display Regions of Images are Dynamically Changed in Junction Region of Image to be Synthesized>

Next, a configuration of an embodiment of the present disclosure for solving the above-described problem will be described.

In the embodiment of the present disclosure, a process is performed of dynamically changing display regions of images to be synthesized in a junction region between the images.

This embodiment will be described below with reference to FIG. 11 and the subsequent drawings.

Figure 11:
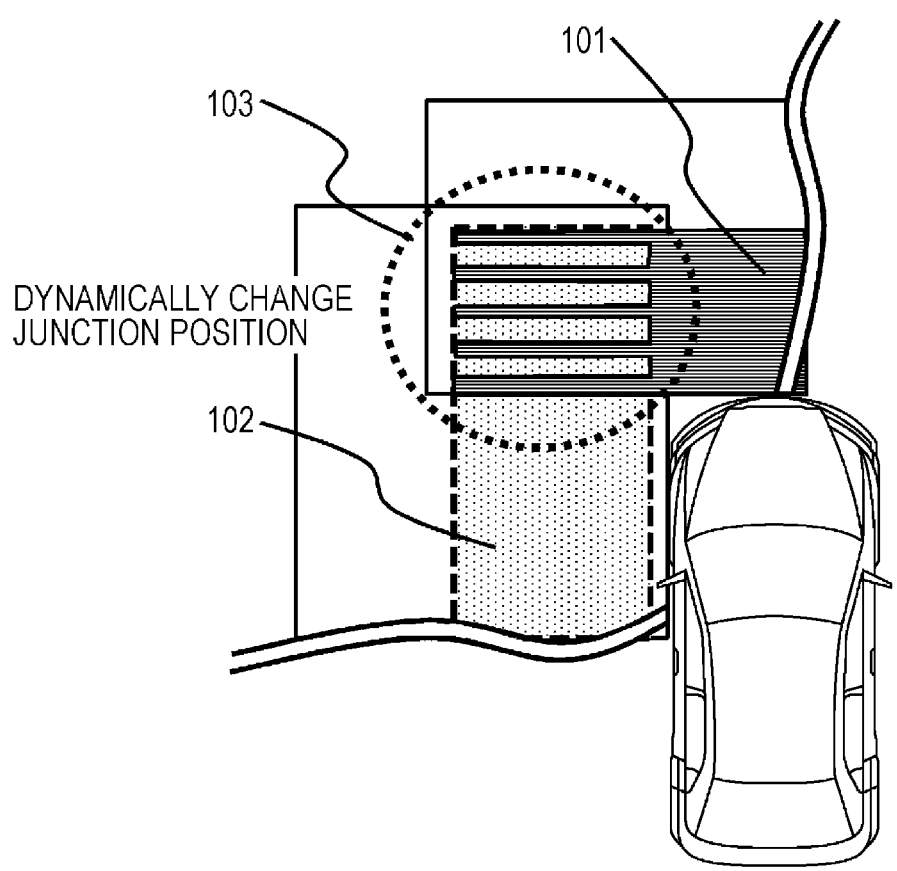
FIG. 11 shows a synthesis image generated according to an embodiment of the present disclosure, and is a diagram illustrating an example of a synthesis image which is displayed on a display unit provided at a driver's seat of a vehicle.

FIG. 11 is a diagram showing a portion of a synthesis image displayed on a display unit provided at a driver's seat of a vehicle. FIG. 11 shows the vicinity of a junction region 103 between a front image 101 and a left side image 102 which are images constituting the synthesis image.

Meanwhile, both the front image 101 and the left side image 102 shown in FIG. 11 are images after an overhead conversion process is performed thereon.

The front image 101 is an image obtained by performing overhead conversion on an image captured by a front camera (equivalent to the camera F shown in FIG. 1) which is mounted on the front of the vehicle.

The left side image 102 is an image obtained by performing overhead conversion on an image captured by a left side camera (equivalent to the camera L shown in FIG. 1) which is mounted on the left side of the vehicle.

In this embodiment, the junction region 103 between the front image 101 and the left side image 102 has the following configuration.

Display regions of the front image 101 and the left side image 102 are alternately set in units of rectangular strip regions, and the strip positions are sequentially moved with a change in time.

Thus, a process of changing the display regions of the front image 101 and the left side image 102 within the junction region 103 with a change in time, that is, a dynamic changing process of the display regions is executed.

The dynamic changing process of the display regions will be described below with reference to FIG. 12.

FIG. 12 is a diagram showing an example of a process of changing the junction region 103 between the front image 101 and the left side image 102 with a change in time.

Time changes in the order of t1, t2, t3, and t4, and states of changes in the display mode of the junction region at the respective times are shown.

The strip region of the front image 101 is sequentially moved upwards with a change in time (t1->t2->t3->t4).

Meanwhile, at the time t5, the time t4 and the subsequent times have the same strip position as that of the time t1. Further, t6, t7, and t8 are set in the same manner as t2, t3, and t4, respectively, and then the same movement of the strip is repeated.

In the example shown in FIG. 12, junction region 103 between the front image 101 and the left side image 102 is a rectangular region. In the rectangular region, some portions correspond to the display region of the front image 101, and the other portions correspond to the display region of the left side image 102. The display regions are sequentially changed with a change in time.

In one display period from the time t1 to the time t5, the display period of the front image 101 and the display period of the left side image 102 are alternately set in all the rectangular regions constituting the junction region 103.

That is, the entire region of the junction region 103 corresponds to a region in which two of the front image 101 and the left side image 102 can be confirmed.

As described above, in the junction region of two overhead images constituting the synthesis image, the displays of the display regions of the respective overhead images are dynamically changed, that is, the displays of the display regions of the respective overhead images are sequentially changed with a change in time, thereby solving the problem, described above with reference to FIGS. 9 and 10, that the stereoscopic object disappears from the synthesis image.

Since it is not possible to exactly see all images by alternately displaying the images, it is difficult to determine danger only by seeing the images. However, a boundary line of a stereoscopic object dynamically runs on a screen by sequentially and variably moving the boundaries of the images in time series.

That is, in this method, since the entire region of the junction region 103 is set to a region in which two of the front image 101 and the left side image 102 can be confirmed, the display region of the stereoscopic object is not completely cut off, and the dynamic boundary line moves, thereby allowing a certain stereoscopic object to be recognized.

Further, in this display method, since the display mode of the junction region changes with a change in time, a dynamic perception view is stimulated, which makes it easier to draw attention by the stimulation from the dynamic perception view in a peripheral visual field in spite of the driver not looking straight at the object.

That is, in the junction region, a stereoscopic object looks like it is moving along a boundary as compared with the other region (static region) in the synthesis image, and thus the junction region functions as an attention-drawing region.

Such an attention-drawing region serves as effective means for detecting a stereoscopic object which is present in the junction region for an observer (driver).

Meanwhile, a configuration is preferably given in which a strip width of the front image 101 and a strip width of the left side image 102, which are set in the junction region 103, are not equal to each other and any one of the strip widths is set to be larger than the other. With such a configuration, an observer can preferentially and visually confirm any one image of the front image 101 and the left side image 102 within the junction region 103, that is, an image which is set to have a larger strip width, which makes it easier to more exactly confirm situations in association with the dynamic movement of the boundary of the stereoscopic object.

Now, reference will be made to FIG. 13 to describe an example in which a stereoscopic object is displayed in a junction region.

FIG. 13 shows an example in which a stereoscopic object is displayed in two display modes at the time t1 and the time t3 among the display modes, described above with reference to FIG. 12, of the junction region at the time t1 to the time t4. That is, examples are shown in which the following two synthesis images are displayed.

(a) Synthesis image at the time t1
(b) Synthesis image at the time t3

Examples are shown in which the synthesis images are displayed at different timings.

A display region of a stereoscopic object is included in each of a front image region and a left side image region which have a strip shape and are set to a junction region.

In the front image 101, a stereoscopic object 111 within the front image is displayed in the front image display region of the junction region in which a strip is set.

On the other hand, also in the left side image 102, a stereoscopic object 112 within the left side image is displayed in the left side image display region of the junction region in which a strip is set.

The stereoscopic object is equivalent to a subject (stereoscopic object) which is cut off in the above-described synthesis image of FIG. 9 and disappears from the synthesis image.

As described above with reference to FIG. 9, this process example is configured such that all of two overhead images to be joined can be observed in a junction region between the overhead images without cutting off ends of the overhead images, and thus it is possible to observe all subjects included in the overhead images.

FIG. 13 shows display modes of synthesis images at two different timings, respectively.

(a) Synthesis image at the time t1
(b) Synthesis image at the time t3

The synthesis images at the timings are shown. Images displayed in a junction region of a synthesis image at the timings are different from each other.

That is, a display region of a front image is different from a display region of a left side image with a change in time, and display regions of a stereoscopic object within the respective images are different from each other with a change in time.

The observer's (driver's) attention has a tendency to face an image region where display information changes, rather than a static region having no change.

Accordingly, the observer's (driver's) eyes have a tendency to face a junction region where display information dynamically changes, and thus it is possible to increase the probability of a stereoscopic object displayed in the junction region being confirmed without being overlooked.

<3. Regarding Display Control Sequence in Junction Region of Image>

Next, a description will be given of a sequence of a display control process of a junction region which is described above with reference to FIG. 11 to FIG. 13.

A process sequence to be described below is a sequence of a display control process of setting an image junction region in which two overhead images are alternately disposed in a strip shape, and executing a display control for sequentially moving strip regions of the images disposed in the image junction region with the lapse of the time.

First, parameters applied to the display control process will be described with reference to FIGS. 14 to 16.

A list of parameters is shown in FIG. 14.

Figure 15:
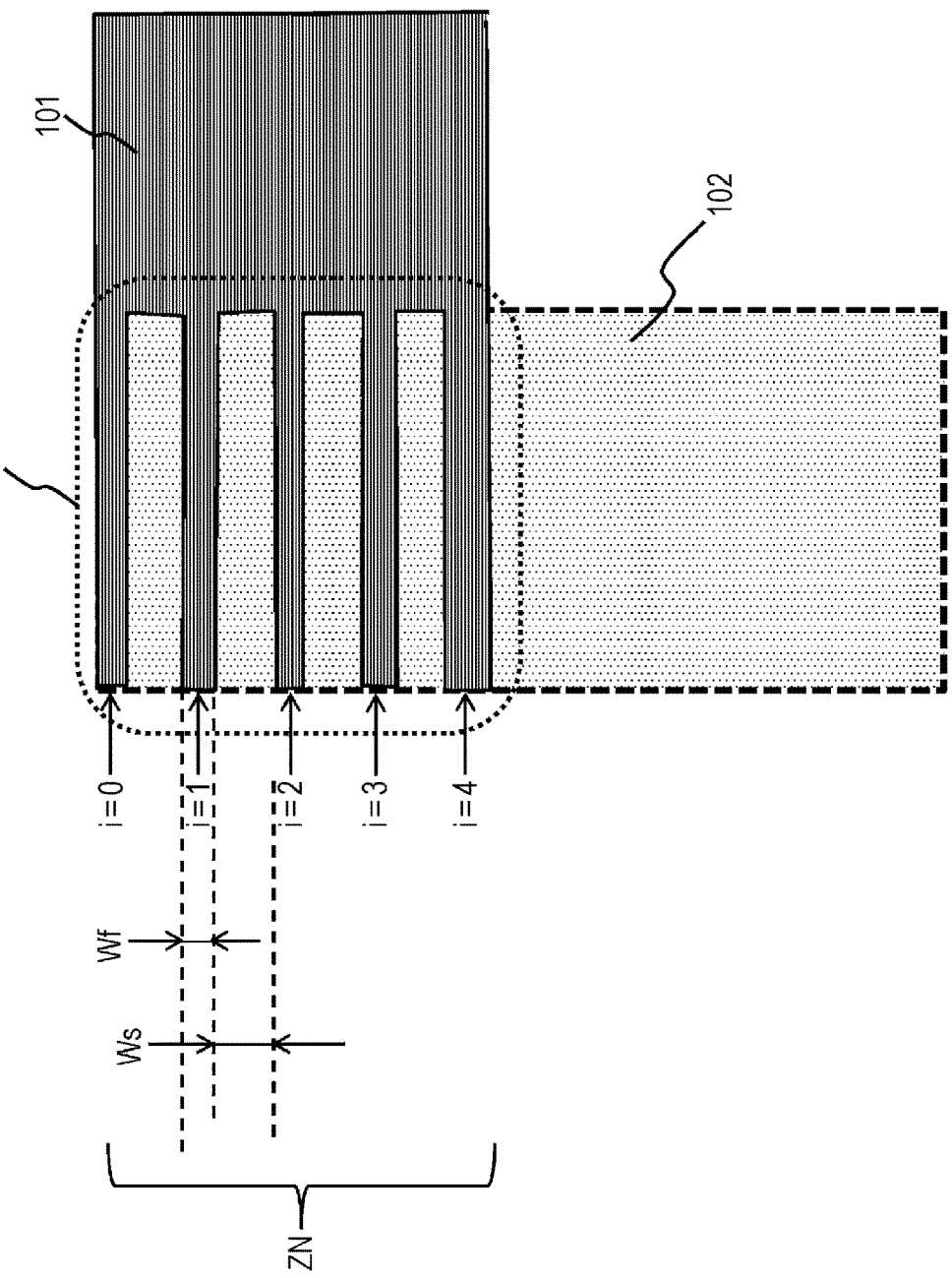
FIG. 15 is a diagram illustrating parameters applied to a display control of a synthesis image according to an embodiment of the present disclosure.
Figure 16:
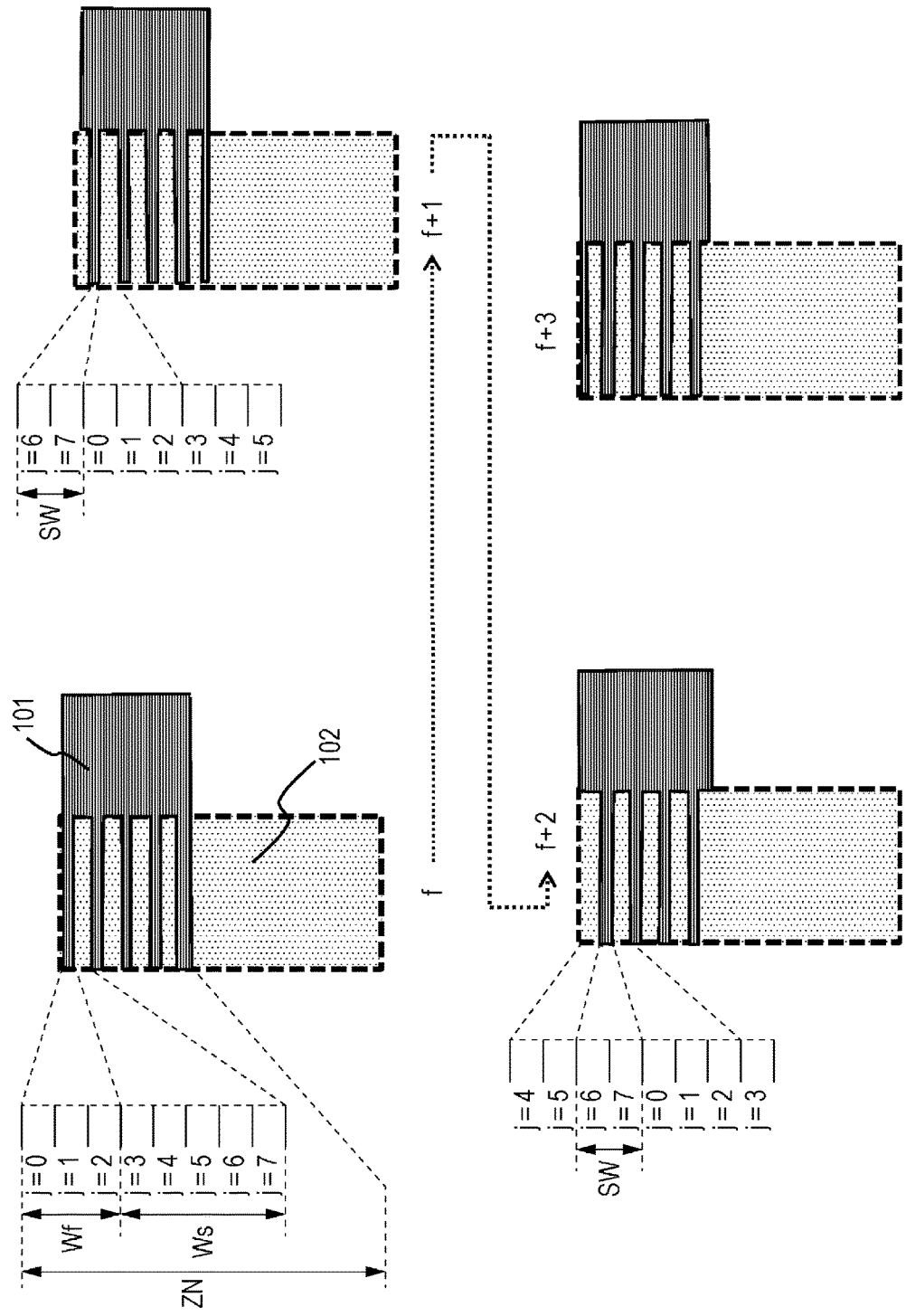
FIG. 16 is a diagram illustrating parameters applied to a display control of a synthesis image according to an embodiment of the present disclosure.

FIGS. 15 and 16 are diagrams illustrating a configuration example of the junction region 103 between the front image 101 and the left side image 102 and the setting of the parameters.

Both the front image 101 and the left side image 102 which are shown in FIGS. 15 and 16 are overhead images after overhead conversion as a correction process is performed thereon.

As shown in FIG. 14, parameters to be used in the display control process of the junction region 103 are as follows.

i: strip identifier, strip identifier of any one image (in this example, front [f] image) of junction region, but first strip identifier i=0 j: line identifier of image formation pixel, line identifier from each strip starting position of any one image (in this example, front [f] image) of junction region, but line of each strip starting position j=0

ZN: strip number specification value, maximum value of strip identifier (i) capable of being set in junction region of image (in this example, front [f] image) in which strip identifier i is set Wf: strip width specification value, maximum value of line identifier (j) which is equivalent to width of one strip of image (in this example, front [f] image) in which strip identifier i is set Ws: strip width specification value, the number of lines equivalent to strip width of the other image (in this example, left side [s] image) which is image (in this example, a front [f] image) in which strip identifier i is not set Wf+Ws: alternate display strip interval specification value in junction region, the number of lines equivalent to strip interval of image (in this example, front [f] image) in which strip identifier i is set SW: strip shift width specification value, the number of strip shift lines per unit frame of image (in this example, front [f] image) in which strip identifier i is set f: display frame identifier The display control of the junction region 103 is executed using these parameters.

As shown in FIG. 15, the strip identifier i is a strip identifier of any one image (in this example, the front [f] image) of the junction region.

For example, identifiers i, i+1, and i+2 are set in order from the top.

Meanwhile, the strip identifier i is set as 0, 1, 2, 3 . . . , using 0 as a first strip identifier.

As shown in FIG. 16, the line identifier j is an identifier indicating the number of lines from each strip starting position of any one image (in this example, front [f] image) of a junction region.

However, the identifier of the line of each strip starting position is set to j=0.

Meanwhile, as described above, a configuration is preferably given in which a strip width of the front image 101 and a strip width of the left side image 102, which are set in the junction region 103, are not equal to each other and in which any one of the strip widths, which is more effective by being shown to a driver more, is set to be larger than the other.

In the example shown in FIG. 16, the strip width of the front image 101 is set to three lines, and the strip width (=width between strips of front image) of the left side image 102 is set to five lines.

With such a configuration, an observer can preferentially confirm the left side image 102 which is set to have a larger strip width within the junction region 103, and thus confirms a stereoscopic object more easily.

The strip number specification value ZN is the maximum value of the strip identifier (i) which can be set in a junction region of an image (in this example, the front [f] image) in which the strip identifier i is set.

In the example shown in FIG. 15, the relationship of ZN=4 is satisfied.

The strip with specification value Wf is the maximum value of the line identifier (j) which is equivalent to a width of one strip of an image (in this example, a front [f] image) in which the strip identifier i is set.

The example shown in FIG. 16 shows a configuration in which a strip having a width of a line identifier j=0 to 2 can be set, and the relationship of Wf=2 is satisfied.

The strip width specification value Ws is a strip width specification value, and is the number of lines equivalent to a strip width of the other image (in this example, a left side [s] image) which is an image (in this example, a front [f] image) in which the strip identifier i is not set.

In the example shown in FIG. 16, the relationship of Ws=5 is satisfied.

The alternate display strip interval specification value Wf+Ws is an alternate display strip interval specification value in a junction region, and is the number of lines equivalent to a strip interval of an image (in this example, a front [f] image) in which the strip identifier i is set.

In the example shown in FIG. 16, the relationship of Wf+Ws=7 is satisfied.

The strip shift width specification value SW is the number of strip shift lines per unit frame of an image (in this example, a front [f] image) in which the strip identifier i is set.

In the example shown in FIG. 16, the relationship of SW=2 is satisfied.

The display frame identifier f is an identifier indicating a display frame number.

As shown in FIG. 16, a shift process of a strip of a junction region is sequentially executed in units of one frame in the order of a frame f, a frame f+1, a frame f+2, and a frame f+3.

The strip is moved in any one direction of an upward direction and a downward direction.

Meanwhile, the shift process is executed in units of one frame in this example, but is not limited thereto.

For example, the process may be set to be executed in units of ten frames.

With such a configuration, the moving speed of the strip is set to be lower.

The display control of the junction region 103 is executed using these parameters.

Next, a specific sequence of a display control sequence using these parameters will be described with reference to a flow chart shown in FIG. 17.

Figure 17:
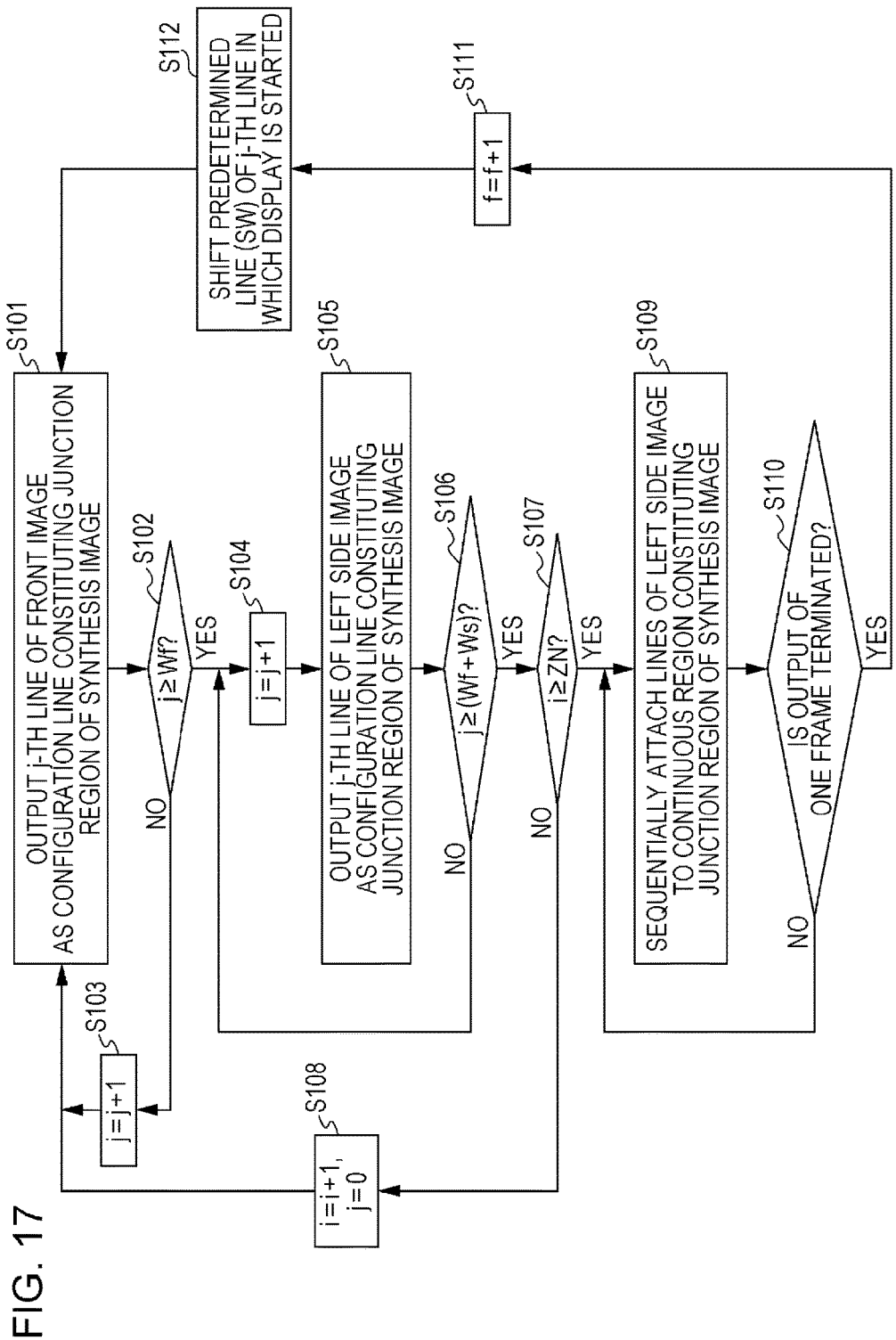
FIG. 17 is a flow chart illustrating a display control sequence of a synthesis image according to an embodiment of the present disclosure.

A processing flow shown in FIG. 17 is a flow illustrating a display control process sequence of a partial region of a synthesis image generated from a plurality of overhead images.

Specifically, for example, the display control process sequence is equivalent to a control sequence of a display process of the junction region 103 shown in FIG. 15 and the image region of the left side image 102 below the junction region.

Meanwhile, also in the other regions, a display control is executed in the same sequence.

For example, the flow shown in FIG. 17 is executed under the control of a data processing unit (control unit) that executes a display control of a display unit mounted on a vehicle.

For example, the data processing unit (control unit) includes a CPU having a function of executing a program, and controls a process based on a program in which the process sequence according to the flow shown in FIG. 16 is recorded.

The program is stored in a memory, a storage medium, or the like, which is a storage unit accessible by the data processing unit (control unit). Alternatively, a configuration may be given in which the program is acquired from an external server or the like through a communication unit.

Hereinafter, processes of steps of the flow chart shown in FIG. 17 will be sequentially described.

Meanwhile, the initial setting of the following parameters is performed as a process before the flow is started.

Strip identifier i=0

Line identifier j=0

After the initial setting of these parameters is performed, the process of step S101 and the subsequent processes are executed.

Step S101

First, in step S101, a j-th line of a front image is output as a line constituting a junction region of a synthesis image.

For example, the process of step S101 is equivalent to a process of generating a strip region constituted by the front image 101 shown in FIGS. 15 and 16.

Meanwhile, as described above, the initial setting is j=0. Initially, a 0-th line of the front image is output. For example, this is equivalent to a process of outputting the line of j=0 which is the uppermost line of the front image 101 in the frame f shown in FIG. 16. That is, the process is equivalent to a process of acquiring the uppermost line (line identifier: j=0) of the first strip (strip identifier: i=0) from the front image 101 and outputting the uppermost line.

Step S102

Next, in step S102, a process of comparing the line identifier j with the strip width specification value Wf is executed. As described above, the strip width specification value Wf is the maximum value of the line identifier (j) which is equivalent to the width of one strip of an image (in this example, a front [f] image) in which the strip identifier i is set. For example, the relationship of Wf=2 is established in the example shown in FIG. 16.

In step S102, it is determined whether the line identifier j is equal to or greater than the strip width specification value Wf. That is, it is determined whether a determination expression of "j is equal to or greater than Wf" is established.

This determination expression is a process for determining whether the number of lines of the front image which is output in step S101, that is, the number of lines constituting the strip of the front image 101 reaches the strip width specification value Wf.

For example, when j=2 in a case of Wf=2, the determination result of step S102 is Yes, and thus the process proceeds to step S104.

In a case of j=0 or j=1, the determination result of step S102 is No, and thus the process proceeds to step S103.

In the first stage, since the relationship of j=0 is satisfied, the determination result of step S102 is No, and thus the process proceeds to step S103.

Step S103

In step S103, a process of updating the line identifier j is executed. That is, the value of j is incremented by one according to an updating expression of j=j+1.

In the first stage, since the relationship of j=0 is satisfied, the relationship of j=1 is established by the updating process.

After the parameter is updated in step S103, a process corresponding to the updated line identifier j is executed in step S101.

That is, when the relationship of j=1 is established, the first line of the front image is output as a line constituting the junction region of the synthesis image.

A loop from step S101 to step S103 is repeated until the determination expression of step S102, that is, a determination expression of "j is equal to or greater than Wf" is established. That is, the line constituting the front image 101 is output to the junction region 103 until the line identifier j reaches the strip width specification value Wf.

For example, as in the example shown in FIG. 16, when j=2 in a case of the strip width specification value Wf=2, the determination result of step S102 is Yes, and thus the process proceeds to step S104.

Thus, one strip (for example, a strip of i=0) of the junction region is completed.

Step S104

Next, in step S104, the line identifier j is incremented by one. That is, the value of the line identifier j is updated according to the updating expression of j=j+1.

Meanwhile, first, when the line identifier j=2 in a case of the strip width specification value Wf=2, the determination result of step S102 is Yes, and thus step S104 is executed. After the relationship of the line identifier j=3 is established, the process proceeds to step S105.

Step S105

Next, in step S105, the j-th line of the left side image is output as a line constituting the junction region of the synthesis image.

For example, the process of step S105 is equivalent to a process of generating a strip region (=region between the strips of the front image 101) which is constituted by the left side image 102 shown in FIGS. 15 and 16.

When the line identifier j=3 in a case of the strip width specification value Wf=2, step S105 is executed. In the example of the frame f of FIG. 16, a process of outputting line data of the left side image 102 as the line of j=3 is performed. That is, a process is executed of outputting the line data of the left side image 102 as the line constituting a region between the strips of the front image 101.

Step S106

Next, in step S106, a process is performed of comparing the line identifier: j with a value obtained by adding the strip width specification value Wf of the front [f] image and the strip width specification value Ws of the left side [s] image (Wf+Ws: alternate display strip interval specification value).

As described above, the strip width specification value Wf is the maximum value of the line identifier (j) which is equivalent to the width of one strip of an image (in this example, the front [f] image) in which the strip identifier i is set. For example, the relationship of Wf=2 is established in the example of FIG. 16.

In addition, the strip width specification value Ws is the number of lines equivalent to a strip width of the other image (in this example, the left side [s] image) which is an image (in this example, the front [f] image) in which the strip identifier i is not set.

Meanwhile, in the example shown in FIG. 16, the relationship of Ws=5 is satisfied.

In step S106, it is determined whether the line identifier j is equal to or greater than the value obtained by adding the strip width specification value Wf and the strip width specification value Ws (Wf+Ws: alternate display strip interval specification value). That is, it is determined whether a determination expression of "j is equal to or greater than (Wf+Ws)" is established.

This determination expression is a process for determining whether the sum of the number of lines constituting the strips which have been already generated by a non-repetitive process of step S101 and the number of lines constituting the strips being generated in step S105 reaches the sum of the strip interval specification values Wf and the strip width specification values Ws of two images in the junction region (Wf+Ws: alternate display strip interval specification value).

For example, when j=7 in a case of the strip width specification value Wf=2 corresponding to the front [f] image and the strip width specification value Ws=5 corresponding to the left side [s] image, the determination result of step S106 is Yes, and thus the process proceeds to step S107.

In a case of j=3 to 6, the determination result of step S106 is No, and thus the process returns to step S104.

In the first stage, since the relationship of j=3 is satisfied, the determination result of step S106 is No, and thus the process returns to step S104 to execute a parameter update for incrementing the value of j by one, that is, j=j+1. Then, the process of step S105 is further executed.

That is, while j=3 to 7, the process of step S105 is repeatedly executed. For example, this process is a process of outputting the images of the left side image 102 to the lines of j=3 to 7 of the frame f shown in FIG. 16. That is, this process is equivalent to a process of filling a space between the strips with the images of the left side image 102.

A loop from step S104 to step S106 is repeated until the determination expression of step S106, that is, a determination expression of "j is equal to or greater than (Wf+Ws)" is established. That is, for example, as shown in FIG. 16, the line constituting the left side image 102 is output to the junction region 103 until the line identifier j reaches the sum of the strip width specification value Wf and the strip width specification value Ws (Wf+Ws: alternate display strip interval specification value).

For example, as in the example shown in FIG. 16, when j=7 in a case of the strip width specification value Wf=2 and the strip width specification value Ws=5, the determination result of step S106 is Yes, and thus the process proceeds to step S107.

When the repetitive loop of step S104 to S106 is terminated, one region between the strips of the junction region is completed.

Step S107 to Step S108

Next, in step S107, a process of comparing the strip identifier i with the strip number specification value ZN is executed.

As shown in FIG. 15, the strip identifier i is a strip identifier of any one image (in this example, the front [f] image) of the junction region. For example, the identifiers i, i+1, and i+2 are set in order from the top. Meanwhile, the strip identifier i is set as 0, 1, 2, 3 . . . , using 0 as a first strip identifier.

The strip number specification value ZN is the maximum value of the strip identifier (i) which can be set in a junction region of an image (in this example, the front [f] image) in which the strip identifier i is set.

In the example shown in FIG. 15, the relationship of ZN=4 is satisfied.

In step S107, it is determined whether the strip identifier i is set to be equal to or greater than the strip number specification value ZN. That is, it is determined whether a determination expression of "i is equal to or greater than ZN" is established.

This is a process for determining whether the number of strips generated in step S101 to step S106 reaches a specified upper limit.

For example, in the example shown in FIG. 15, the strip number specification value ZN=4 is satisfied, and the number of strips that can be set within the junction region 103 is five. Thus, the strips can be set until the relationship of the strip identifier i=4 is satisfied.

That is, in a case of i=0 to 3, the determination result of step S107 is No, and thus the process proceeds to step S108 to execute a parameter update for incrementing the strip identifier i by one and resetting the line identifier j to 0. Then, the processes of step S101 to step S106 are repeated.

That is, the subsequent process of outputting spaces between the strips is executed.

In the examples shown in FIGS. 15 and 16, one strip region is generated by outputting three lines of the front image 101, and a region between the strips is generated by outputting five lines of the left side image 102.

This process is repeated a specified number of times, that is, until the determination expression of "i is equal to or greater than ZN" in step S107 is satisfied.

This process is repeated, thereby completing, for example, a configuration in which the image within the junction region 103 shown in FIG. 15 is output. That is, an image is completed of the junction region which is constituted by a repetitive configuration including three lines of strip images of the front image 101 and five lines of images between the strips of the left side image.

Step S109

Next, in step S109, a process is executed of sequentially attaching the lines of the left side image to a continuous region of the junction region of the synthesis image.

For example, this process is equivalent to the process of outputting the left side image 102 below the junction region 103 shown in FIG. 15.

Step S110

In step S110, it is determined whether the output of the image for one frame is terminated.

That is, it is determined whether the output of the left side image 102 is completed.

When the output is not terminated, the process returns to step S109 to sequentially output the lines constituting the left side image 102.

When it is determined in step S110 that the output of the image for one frame is terminated, the process proceeds to step S111.

The flow shown in FIG. 17 is a flow in which a display control is executed of a portion of the synthesis image, that is, regions to be output of the junction region 103 shown in FIG. 15 and the left side image 102 below the junction region.

It is also possible to perform an output control on the other regions in the synthesis image by the same process sequence only by changing the setting of the "front image" and the "left side image" in the flow shown in FIG. 17.

Step S111

In step S111, a frame identifier f is updated. That is, the frame identifier f is incremented by one according to an updating expression of f=f+1.

For example, this process is equivalent to a process of performing transition from the frame f to the frame f+1 shown in FIG. 16.

Step S112

In step S112, a process is performed of shifting a j-th line in which a display is started, by a predetermined number of lines (SW).

Here, SW is a strip shift width specification value, and is the number of strip shift lines per unit frame of an image (in this example, the front [f] image) in which the strip identifier i is set.

In the example shown in FIG. 16, the relationship of SW=2 is satisfied.

That is, a process is executed of shifting the line in which the relationship of line identifier j=0 is set, by two lines.

For example, in the example shown in FIG. 15, the position of j=0 indicating the position of the first line of the first strip of the front image 101 is associated with the position of the uppermost line of the front image 101 in the frame f. As in the setting of the frame f+1, a process of moving the position of j=0 by two lines in the downward direction is performed.

As a result of this process, the position to be output of the strip constituted by the front image 101 is shifted, that is, displaced by the number of strip shift lines.

After this shift process is executed, the process of step S101 and the subsequent processes are executed.

As a result of this process, for example, an image is generated and output of a junction region including a strip configuration having the setting of the frame f+1 shown in FIG. 15.

When it is determined in step S110 that the output of the image of the frame f+1 is completed, the shift process is executed in step S111 in which the number of strip shift lines SW=2 is satisfied, and then the process of step S101 and the subsequent processes are executed.

As a result of this process, for example, an image is generated and output of a junction region including a strip configuration having the setting of the frame f+2 shown in FIG. 15.

Similarly, when it is determined in step S110 that the output of the image of the frame f+2 is completed, the shift process is executed in step S111 in which the number of strip shift lines SW=2 is satisfied, and then the process of step S101 and the subsequent processes are executed.

As a result of this process, for example, an image is generated and output of a junction region including a strip configuration having the setting of the frame f+3 shown in FIG. 15.

As a result of this process, the strips in the junction region are sequentially shifted, and the display regions of the front image 101 and the left side image are changed and displayed with a change in time.

Meanwhile, the amount of shift (SW) per one frame can be variously set, and it is possible to change a moving speed of the strip in various ways in accordance with the setting of the amount of shift (SW).

In addition, it is also possible to variously set the other parameters, that is, the strip width specification value Ws, the strip interval specification value Wf, and the strip number specification value ZN, and to change a pattern of the strip displayed in the junction region by adjusting these parameters.

In addition, as described above with reference to FIG. 16, the shift process is executed in units of one frame in this example, but is not limited thereto. The process may be executed in units of any number of frames or in units of n frames. Herein, n is an integer equal to or greater than 1.

In this case, the determination process of step S110 may be set to a determination process of "is output of n frames terminated?", and the process of step S111 may be set to an updating process in which "f=f+n" is set.

In order to increase the interval of the updating process, the value of n may be increased, and n may be set to 10 or 20. With such a configuration, the moving speed of the strip is set to be lower.

<4. Regarding Example of Process of Highlighting Specific Object Displayed in Junction Region>

As described above, the above-described embodiment is configured to change display regions of two overhead conversion images with a change in time in a junction region between the overhead conversion images.

In this manner, it is possible to draw attention of a driver as an observer by a dynamic change in display information.

Further, a description will be given of an example of a process of highlighting a stereoscopic object displayed in a junction region in order to more strongly direct attention to the stereoscopic object displayed in the junction region.

Figure 18:
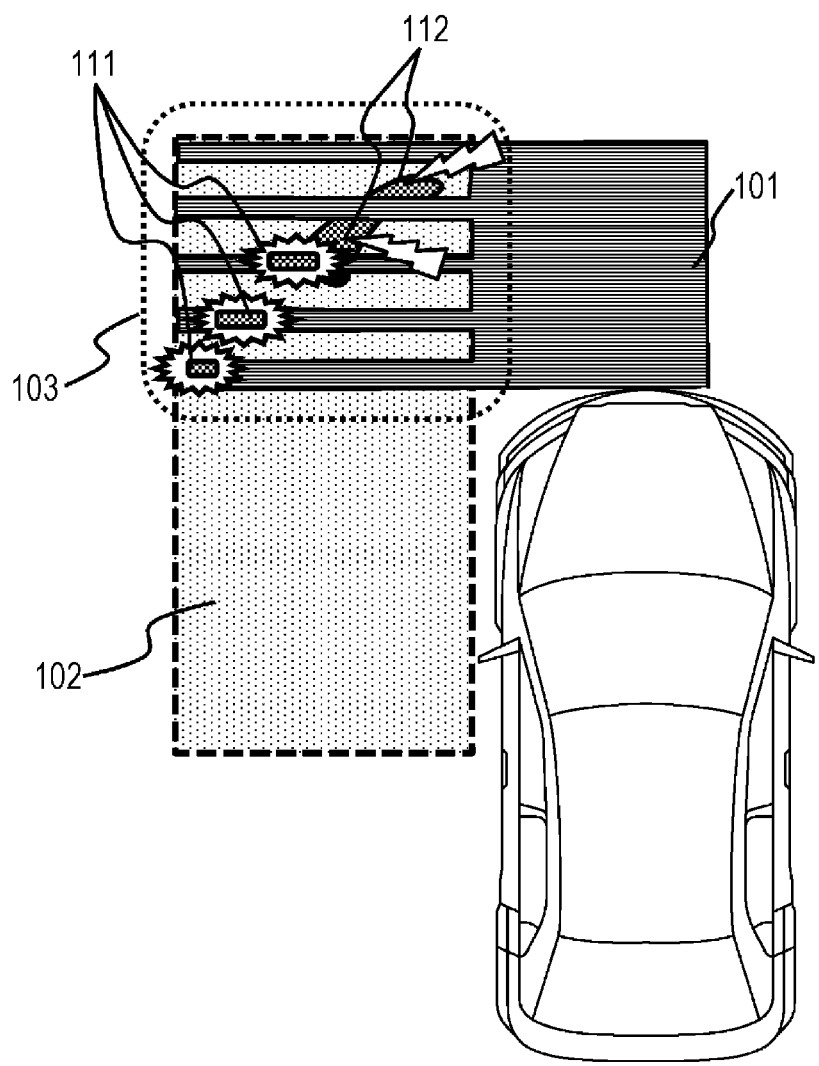
FIG. 18 is a diagram illustrating an example in which a stereoscopic object is displayed in a junction region of a synthesis image according to an embodiment of the present disclosure.

FIG. 18 shows a display example in which a stereoscopic object displayed in the junction region 103 between the front image 101 and the left side image 102.

The stereoscopic object is displayed as a stereoscopic object 111 within the front image in the strip region which is the display region of the front image 101, and is displayed as a stereoscopic object 112 within the left side image in the region between strips which is the display region of the left side image.

The display of the stereoscopic objects is highlighted. Specifically, highlighting is performed in a conspicuous display mode by a blinking display or by changing color, brightness, and the like.

Meanwhile, the degree of highlighting in the junction region is set in any one of the following manners.

(a) Highlighting is uniformly performed on the entirety of a stereoscopic object region.

(b) The degree of highlighting performed on a portion of the stereoscopic object region which is close to a boundary of a junction image is set to be higher, and the degree of highlighting is set to be lower as a distance from the boundary of the junction image increases.

Meanwhile, in a process of detecting a stereoscopic object region included in each of the front image 101 and the left side image 102, a difference between pixel values of the front image 101 and the left side image 102 is calculated, and the region having a larger difference between the pixel values is determined to be a display region of the stereoscopic object.

As described above, overhead conversion is a conversion process performed on the basis of one reference plane. In this case, the reference plane is the ground. Since distortion of the front image 101 and the left side image 102 is removed with respect to the ground, subjects located on the same ground are displayed on the positions of the corresponding pixels of the respective images. Accordingly, pixel values of the positions of the corresponding pixels of the respective images are substantially the same, and a difference therebetween hardly occurs.

However, since distortion remains in the stereoscopic object in spite of the execution of the overhead conversion, there is a high possibility of the pixels, which are located at the respective positions of the corresponding pixels of the front image 101 and the left side image 102, serving as display regions of different subjects, and thus a difference occurs between the pixel values of the positions of the corresponding pixels of the two overhead conversion images. The pixel regions in which such a difference remains are determined to be display regions of the stereoscopic object. Meanwhile, the sum of absolute differences (SAD) for performing calculation in units of a plurality of pixels of predetermined unit regions of images can be applied to the process of determining the difference between the pixel values of the positions of the corresponding pixels of the two images.

<5. Regarding Example in which Display Mode Changes in Junction Region>

In the above-described embodiment, a configuration example has been described in which rectangular strip type display regions are alternately set in two overhead images in a junction region therebeween and the rectangular strip type display regions are moved with a change in time.

Hereinafter, an embodiment having a different display configuration from that of the above-described embodiment will be described.

<5-1. Embodiment in which Curved Strip Type Display Regions are Alternately Set (Second Embodiment)>

As a second embodiment, an embodiment in which curved strip type display regions are alternately set will be described with reference to FIG. 19 and the subsequent drawings.

Figure 19:
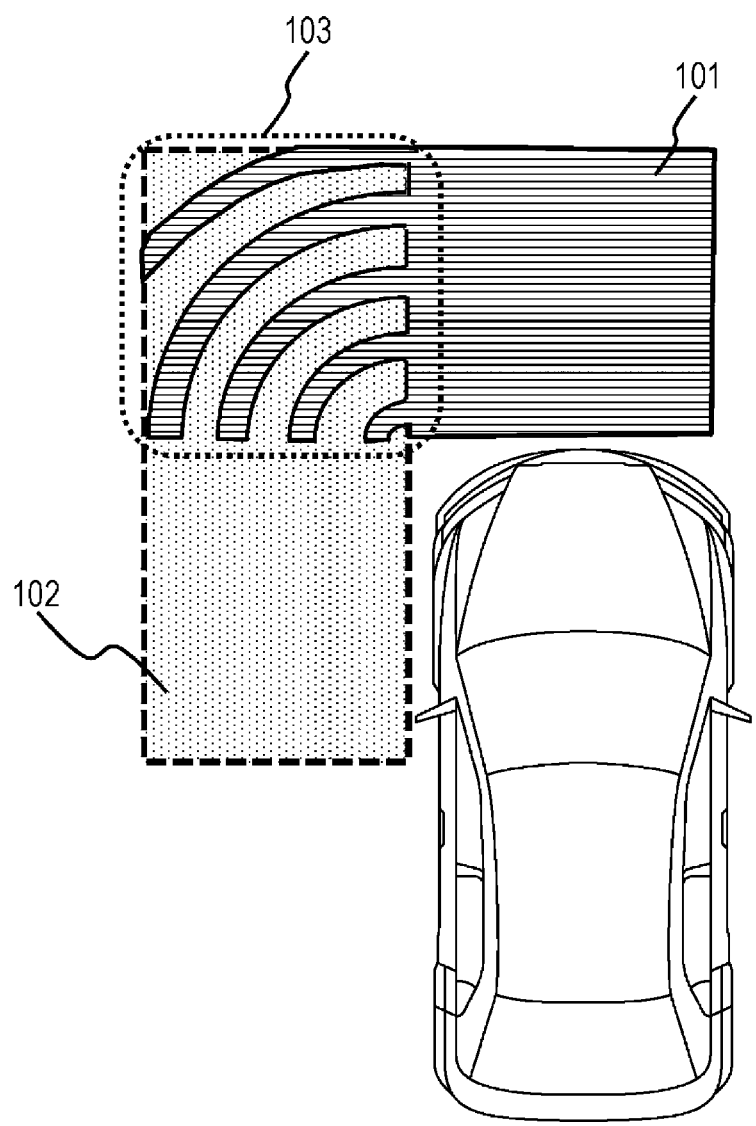
FIG. 19 shows a synthesis image generated according to an embodiment of the present disclosure, and is a diagram illustrating an example of a synthesis image which is displayed on a display unit provided at a driver's seat of a vehicle.

FIG. 19 is a diagram showing a portion of a synthesis image which is displayed on a display unit provided at a driver's seat of a vehicle. That is, FIG. 19 is a diagram showing the vicinity of a junction region 103 between a front image 101 and a left side image 102 which are images constituting the synthesis image.

Meanwhile, both the front image 101 and the left side image 102 shown in FIG. 19 are images after an overhead conversion process is performed thereon.

That is, the front image 101 is an image obtained by performing overhead conversion on an image captured by a front camera (equivalent to the camera F shown in FIG. 1) which is mounted on the front of a vehicle.

The left side image 102 is an image obtained by performing overhead conversion on an image captured by a left side camera (equivalent to the camera L shown in FIG. 1) which is mounted on the left side of the vehicle.

This embodiment is configured such that display regions of the front image 101 and the left side image 102 are alternately set in units of curved strip type display regions in the junction region 103 between the front image 101 and the left side image 102. Further, these strip positions are sequentially moved with a change in time.

That is, the display regions of the front image 101 and the left side image 102 in the junction region 103 are set to change with a change in time.

The dynamic changing process of the display regions will be described below with reference to FIG. 20.

Figure 20:
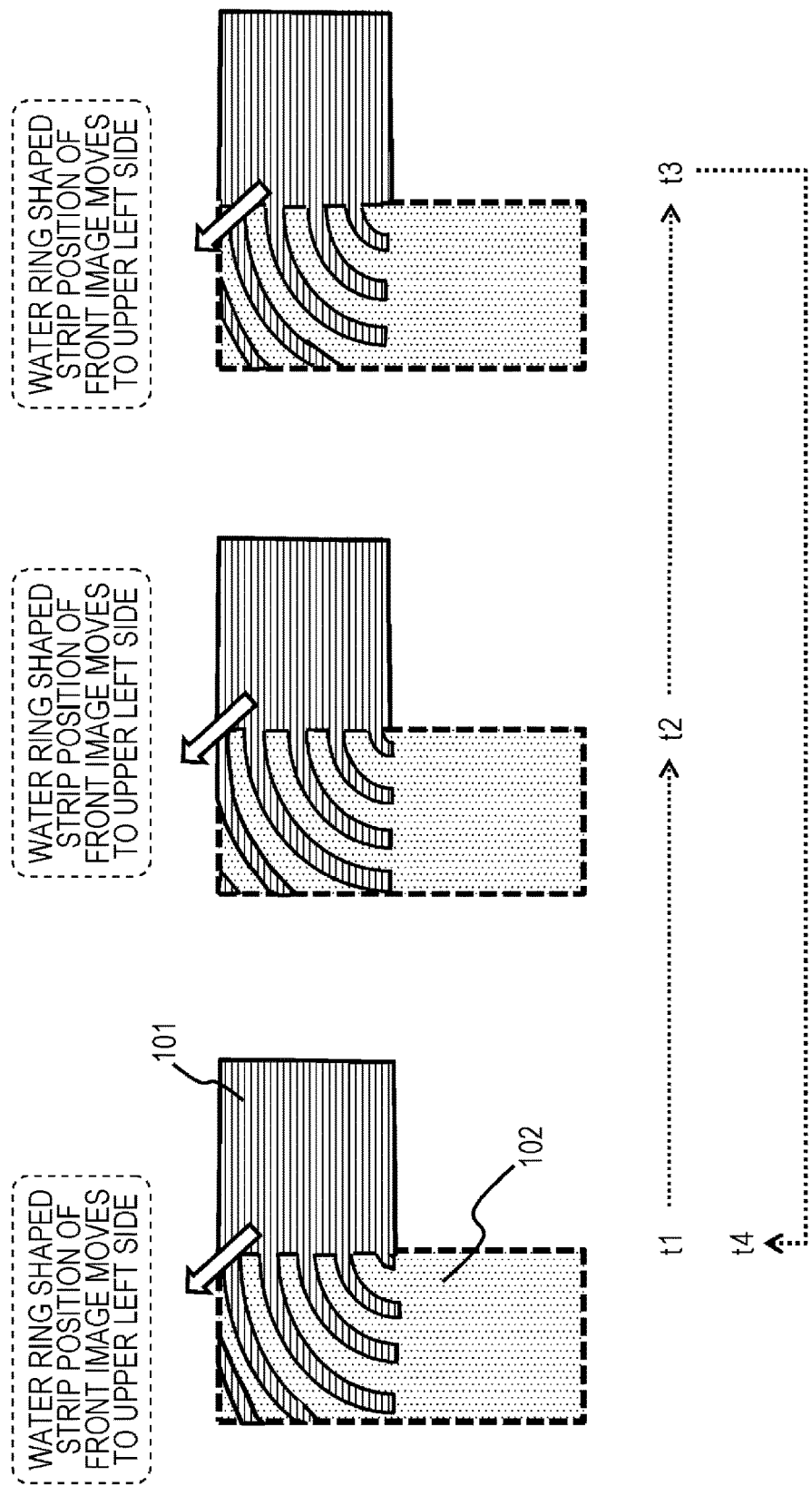
FIG. 20 is a diagram illustrating an embodiment in which a display mode changes with a change in time in a junction region of a synthesis image according to an example of the present disclosure.

FIG. 20 is a diagram showing a change in the junction region 103 between the front image 101 and the left side image 102 with a change in time. Time changes in the order of t1, t2, and t3, and states of changes in the junction region at the respective times are shown.

The strip region having a curved shape of the front image 101 is sequentially moved obliquely in an upper left direction with a change in time (t1->t2->t3). Meanwhile, at the time t4, the time t3 and the subsequent times have the same strip position as that of the time t1. Further, t5 and t6 are set in the same manner as t2 and t3, respectively, and then the same movement of the strip is repeated.

In the example shown in FIG. 20, the display regions of the front image 101 and the left side image 102 are alternately set in units of curved strips within the junction region 103. However, the display regions are sequentially changed with a change in time.

In one display period from the time t1 to the time t4, the display period of the front image 101 and the display period of the left side image 102 are alternately set in the entirety of the junction region 103, and an observer can confirm two of the front image 101 and the left side image 102 in the entirety of the junction region 103.

Accordingly, similarly to the above-described embodiment in which rectangular strip regions are set, the problem, described above with reference to FIGS. 9 and 10, that a stereoscopic object disappears from a synthesis image is solved also in this example.

That is, also in this embodiment, since the entirety of the junction region 103 is set to a region where two of the front image 101 and the left side image 102 can be confirmed, the display region of the stereoscopic object can be confirmed without being cut off.

Further, also in this embodiment, the junction region serves as a display region changing with a change in time, and thus serves as a region drawing an observer's attention. That is, the junction region serves as a region which further draws attention, that is, an attention-drawing region as compared with the other regions (static regions) in the synthesis image. The observer (driver) easily confirms the stereoscopic object in the junction region by setting such an attention-drawing region.

Meanwhile, a configuration is preferably given in which the width of the curved strip of the front image 101 and the width of the curved strip of the left side image 102 (=interval between the curved strips of the front image 101), which are set in the junction region 103, are not equal to each other and any one of the widths is set to be larger than the other. With such a configuration, an observer can preferentially and visually confirm any one image of the front image 101 and the left side image 102 within the junction region 103, that is, an image which is set to have a larger strip width, which makes it easier to confirm the stereoscopic object.

Figure 21:
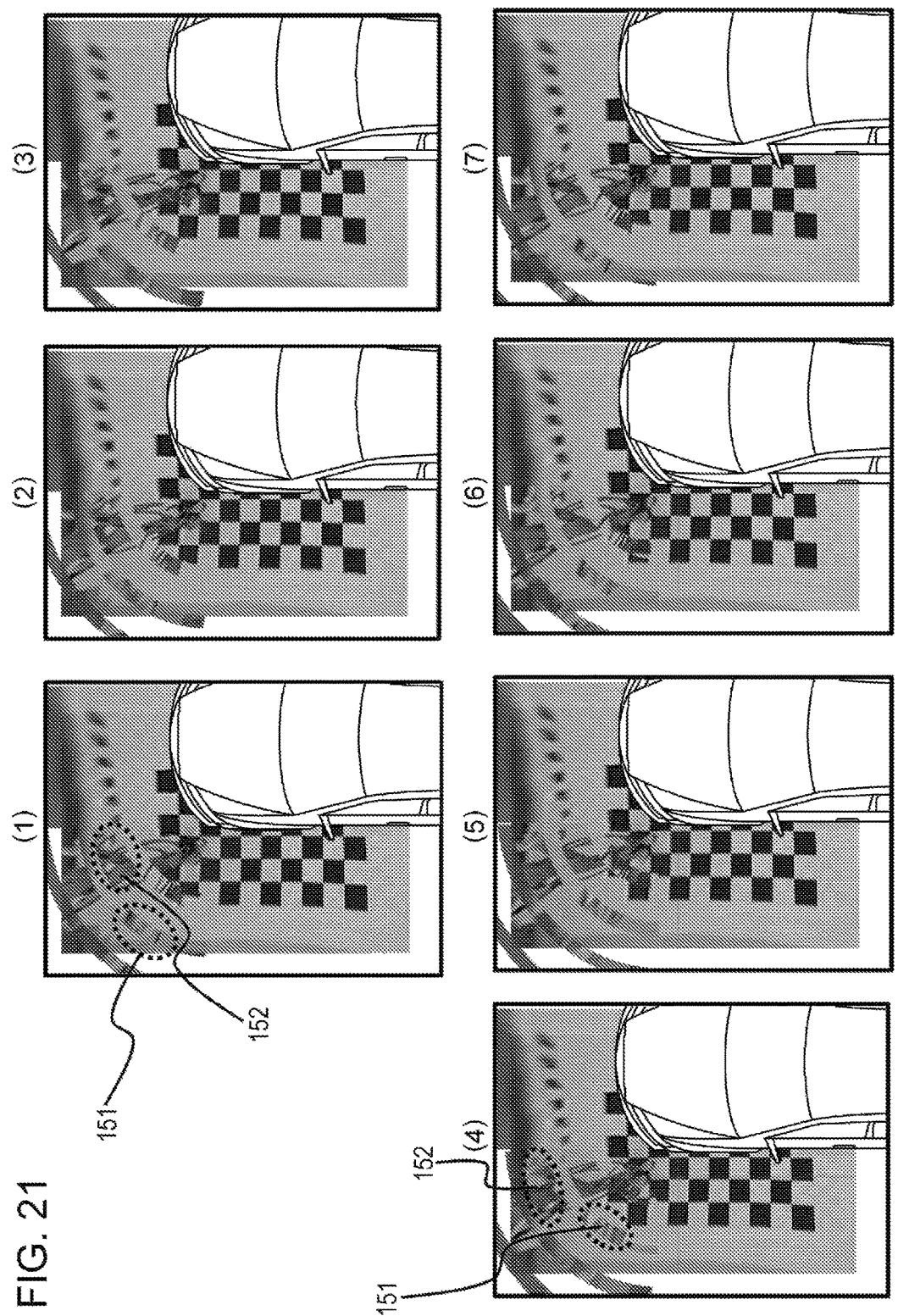
FIG. 21 is a diagram illustrating an embodiment in which a stereoscopic object is displayed in a junction region of a synthesis image according to an example of the present disclosure.

FIG. 21 is a diagram showing an example in which the synthesis image according to this embodiment is actually displayed. FIG. 21 shows changes in display information of a junction region with a change in time. The position of a fan-shaped strip is gradually moved. A stereoscopic object can be observed in the junction region.

A stereoscopic object 151 within a front image which is shown in the drawing is a stereoscopic object displayed in a front image display region.

A stereoscopic object 152 within a left side image is a stereoscopic object displayed in a left side image display region.

The stereoscopic objects are subjects (stereoscopic objects) included in the image region which is cut off in the above-described process of FIG. 9.

This process example is configured such that all of two overhead images to be joined can be observed in a junction region between the overhead images without cutting off ends of the overhead images, and thus it is possible to observe all subjects included in the overhead images.

Also in this embodiment, it is possible to perform a process of highlighting a stereoscopic object displayed in a junction region in order to further direct attention to the stereoscopic object displayed in the junction region.

Figure 22:
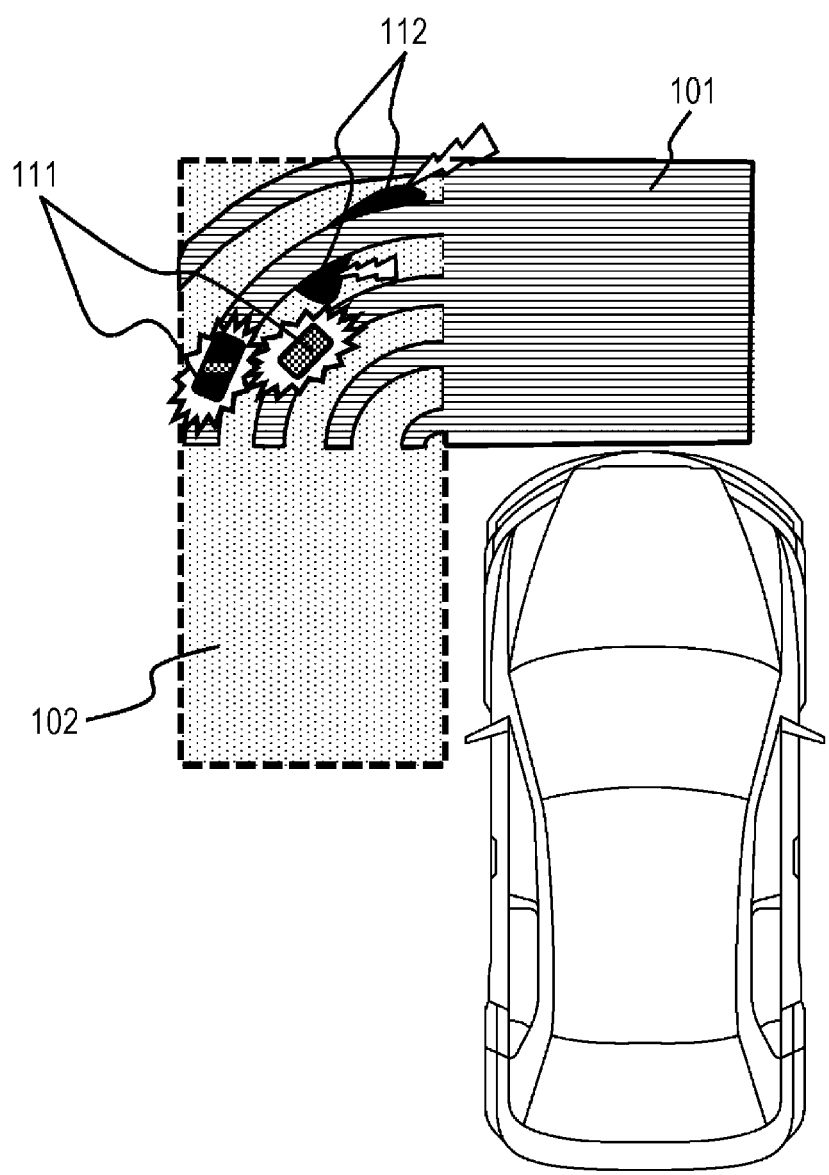
FIG. 22 is a diagram illustrating an embodiment in which a stereoscopic object is displayed in a junction region of a synthesis image according to an example of the present disclosure.

FIG. 22 shows a display example in which a stereoscopic object displayed in the junction region 103 between the front image 101 and the left side image 102.

The stereoscopic object is displayed as the stereoscopic object 151 within the front image in the strip region which is the display region of the front image 101, and is displayed as the stereoscopic object 152 within the left side image in the region between strips which is the display region of the left side image.

The display of the stereoscopic objects is highlighted. Specifically, highlighting is performed in a conspicuous display mode by a blinking display or by changing color, brightness, and the like.

Meanwhile, in a process of detecting a stereoscopic object region included in each of the front image 101 and the left side image 102, it is possible to calculate a difference between pixel values of the front image 101 and the left side image 102 as described above with reference to FIG. 18 and to determine the region having a larger difference between the pixel values to be a display region of the stereoscopic object.

Specifically, it is possible to apply the sum of absolute differences (SAD) for performing calculation in units of a plurality of pixels of predetermined unit regions of images.

It is possible to further strongly draw attention of a driver as an observer by such a cooperative display process of the stereoscopic object.

<5-2. Embodiment in which Image Boundary of Junction Region is Moved (Third Embodiment)>

Next, as a third embodiment, an embodiment in which an image boundary of a junction region is moved will be described with reference to FIG. 23 and the subsequent drawings.

Figure 23:
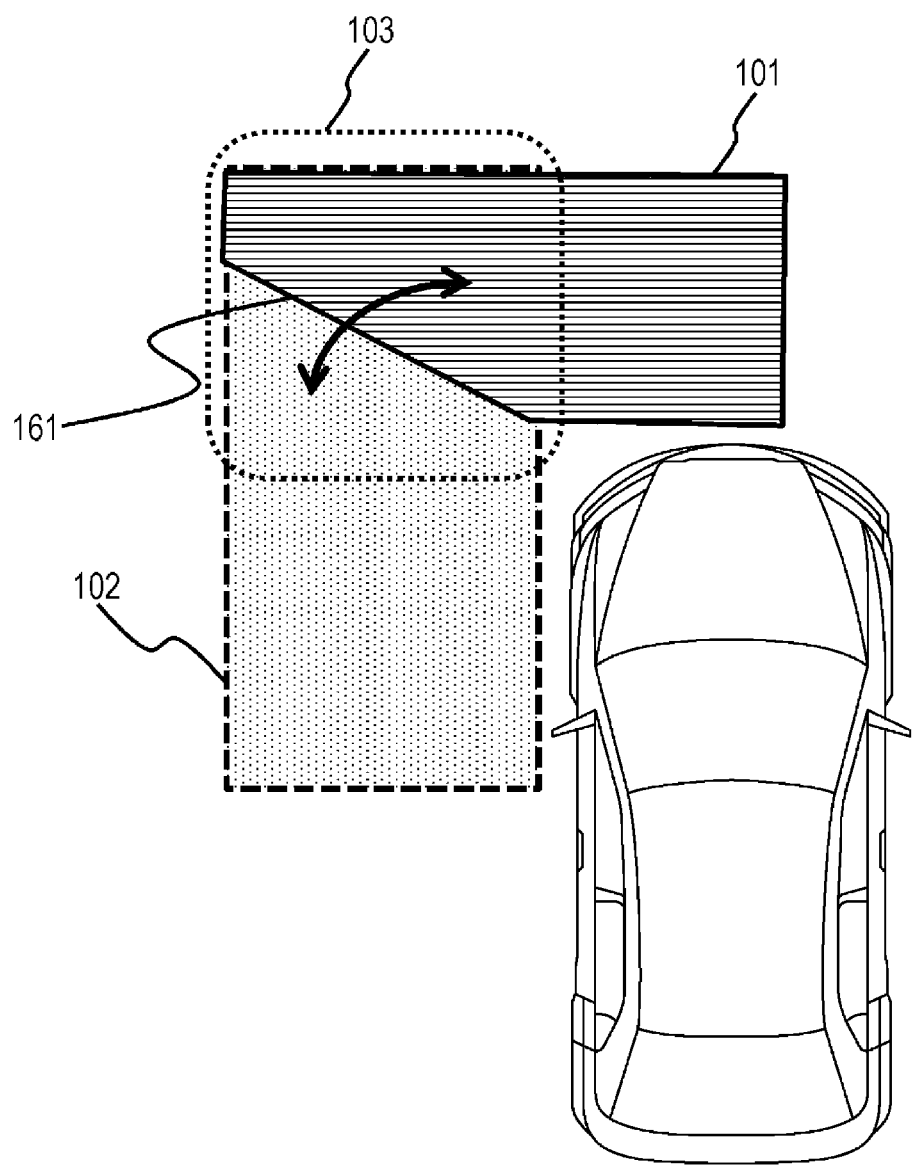
FIG. 23 shows a synthesis image generated according to an embodiment of the present disclosure, and is a diagram illustrating an example of a synthesis image displayed on a display unit provided at a driver's seat of a vehicle.

FIG. 23 is a diagram showing a portion of a synthesis image which is displayed on a display unit provided at a driver's seat of a vehicle. That is, FIG. 23 is a diagram showing the vicinity of a junction region 103 between a front image 101 and a left side image 102 which are images constituting the synthesis image.

Meanwhile, both the front image 101 and the left side image 102 shown in FIG. 23 are images after an overhead conversion process is performed thereon.

That is, the front image 101 is an image obtained by performing overhead conversion on an image captured by a front camera (equivalent to the camera F shown in FIG. 1) which is mounted on the front of a vehicle.

The left side image 102 is an image obtained by performing overhead conversion on an image captured by a left side camera (equivalent to the camera L shown in FIG. 1) which is mounted on the left side of the vehicle.

This embodiment is configured such that display regions of the front image 101 and the left side image 102 are partitioned by one image boundary 161 in the junction region 103 between the front image 101 and the left side image 102. The image boundary 161 is moved with a change in time.

An example of a process of moving the image boundary 161 will be described below with reference to FIG. 24.

Figure 24:
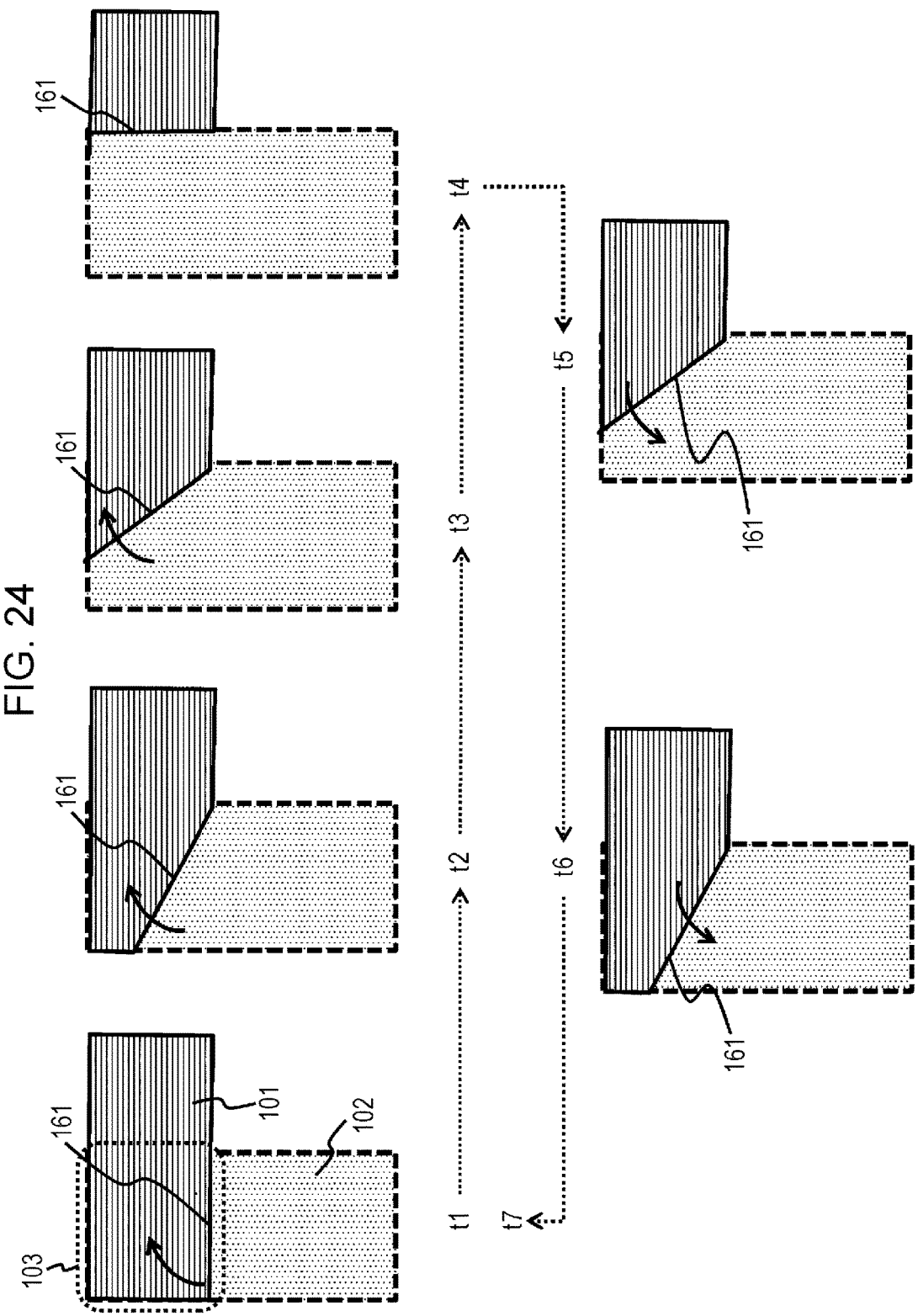
FIG. 24 is a diagram illustrating an example in which a display mode changes with a change in time in a junction region of a synthesis image according to an embodiment of the present disclosure.

FIG. 24 is a diagram showing the movement of the image boundary 161 between the front image 101 and the left side image 102, which is set within the junction region 103 between the front image 101 and the left side image 102, with a change in time. Time changes in the order of t1, t2, and t3, and states of changes in the position of the image boundary 161 within the junction region at the respective times are shown.

First, the image boundary 161 is rotated clockwise centering on the lower left end of the junction region 103.

At the time t1, the entirety of the junction region 103 is set to the display region of the front image 101. Thereafter, the image boundary 161 is rotated clockwise from the time t1 to the time t4, and the display region of the front image 101 in the junction region 103 is sequentially switched to the display region of the left side image 102 from the lower left side thereof.

At the time t4, the entirety of the junction region 103 is set to the display region of the left side image 102. Thereafter, the image boundary 161 is rotated counterclockwise from the time t4 to the time t7, and the display region of the left side image 102 in the junction region 103 is sequentially switched to the display region of the front image 101 from the upper right side thereof.

Similarly to the time t1, the entirety of the junction region 103 is set to the display region of the front image 101 at the time t7.

Hereinafter, similarly, the image boundary 161 repeats the same movement, that is, the right rotation and left rotation thereof. That is, the image boundary reciprocates in the same manner as a windshield wiper of a vehicle.

In this manner, the synthesis image of this embodiment has a junction region which is set such that a boundary position repeats the right rotation and left rotation thereof centering on a predetermined point.

Meanwhile, a configuration is preferably given in which the speed of the right rotation is not the same as the speed of the left rotation and the rotation speed in any one direction is set to be lower than the rotation speed in the other direction. The rotation speeds are set to be different from each other, for example, at a ratio of 1 to 2 or more.

With such a configuration, an observer can preferentially observe an image in a case of slow rotation, and thus easily confirm the entire image of a stereoscopic object at that time.

In one display period from the time t1 to the time t7, display periods of the front image 101 and the left side image 102 are set in the entirety of the junction region 103, and the observer can confirm two of the front image 101 and the left side image 102 in the entirety of the junction region 103.

Accordingly, similarly to the above-described example in which rectangular strip regions are set, the problem, described above with reference to FIGS. 9 and 10, that a stereoscopic object disappears from a synthesis image is solved also in this embodiment.

That is, also in this embodiment, since the entirety of the junction region 103 is set to a region where two of the front image 101 and the left side image 102 can be confirmed, the display region of the stereoscopic object can be confirmed without being cut off.

Figure 25:
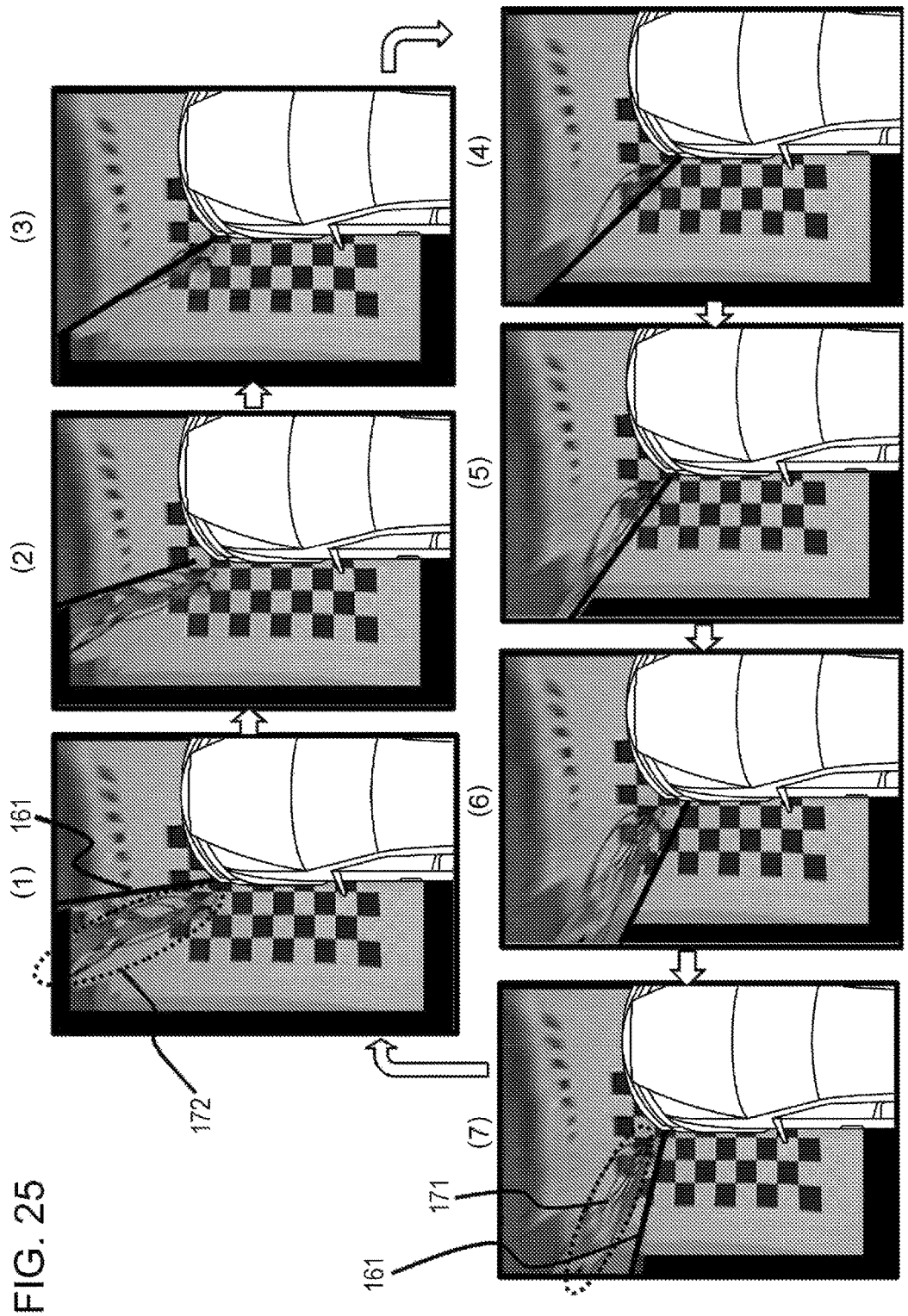
FIG. 25 is a diagram illustrating an example in which a stereoscopic object is displayed in a junction region of a synthesis image according to an embodiment of the present disclosure.

FIG. 25 is a diagram showing an example in which the synthesis image according to this embodiment is actually displayed. FIG. 25 shows changes in display information of a junction region with a change in time. The image boundary 161 is gradually moved. A stereoscopic object can be observed in the junction region.

A stereoscopic object 172 within a left side image which is shown in the drawing is a stereoscopic object displayed in a left side image display region. A stereoscopic object 171 within a front image is a stereoscopic object displayed in a front image display region.

The stereoscopic objects are subjects (stereoscopic objects) included in the image region which is cut off in the above-described process of FIG. 9.

This process example is configured such that all of two overhead images to be joined can be observed in a junction region between the overhead images without cutting off ends of the overhead images, and thus it is possible to observe all subjects included in the overhead images.

Further, also in this embodiment, the junction region serves as a display region changing with a change in time, and thus serves as a region drawing an observer's attention. That is, the junction region serves as a region which further draws attention, that is, an attention-drawing region as compared with the other regions (static regions) in the synthesis image. The observer (driver) easily confirms the stereoscopic object in the junction region by setting such an attention-drawing region.

Also in this embodiment, it is possible to perform a process of highlighting a stereoscopic object displayed in a junction region in order to further direct attention to the stereoscopic object displayed in the junction region.

Figure 26:
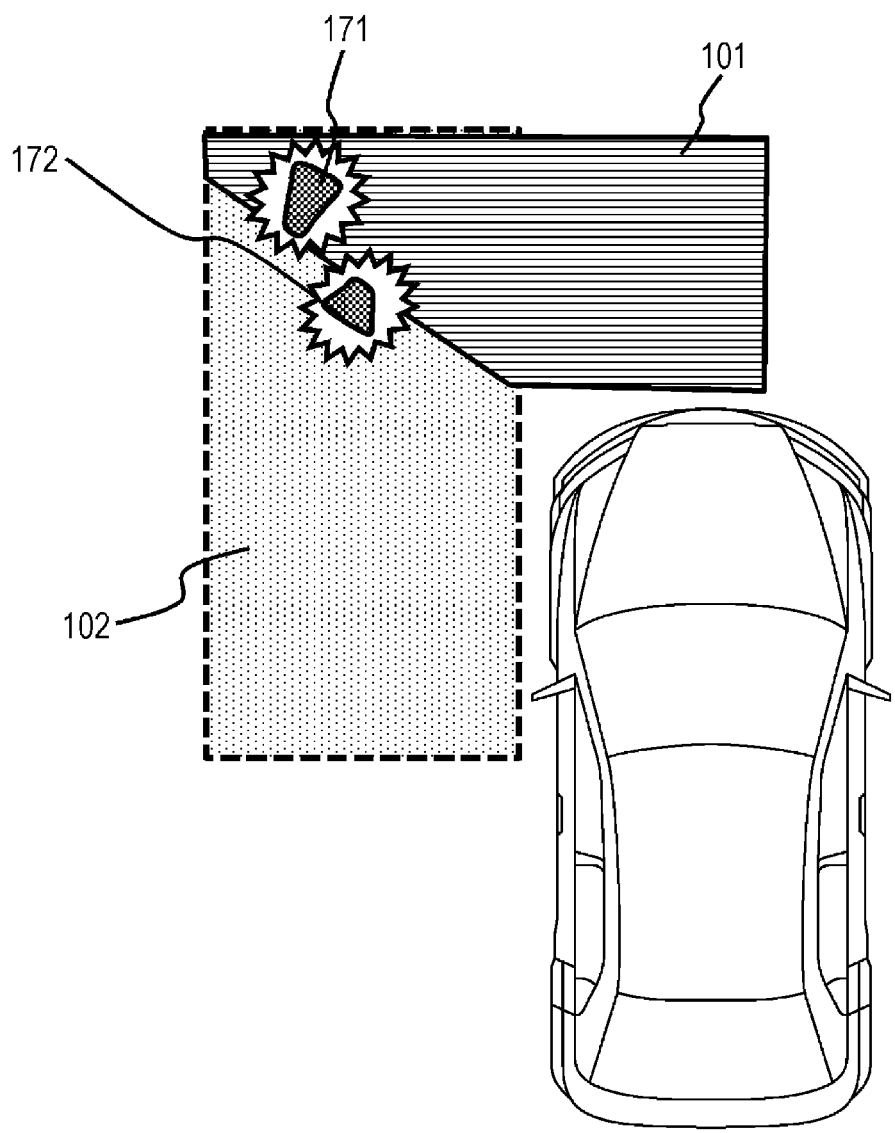
FIG. 26 is a diagram illustrating an example in which a stereoscopic object is displayed in a junction region of a synthesis image according to an embodiment of the present disclosure.

FIG. 26 shows a display example in which a stereoscopic object displayed in the junction region 103 between the front image 101 and the left side image 102.

The stereoscopic object is displayed as the stereoscopic object 171 within a front image in the display region of the front image 101, and is displayed as the stereoscopic object 172 within a left side image in the region between strips which is the display region of the left side image.

The display of the stereoscopic objects is highlighted. Specifically, highlighting is performed in a conspicuous display mode by a blinking display or by changing color, brightness, and the like.

Meanwhile, in a process of detecting a stereoscopic object region included in each of the front image 101 and the left side image 102, it is possible to calculate a difference between pixel values of the front image 101 and the left side image 102 as described above with reference to FIG. 18 and to determine the region having a larger difference between the pixel values to be a display region of the stereoscopic object.

Specifically, it is possible to apply the sum of absolute differences (SAD) for performing calculation in units of a plurality of pixels of predetermined unit regions of images.

It is possible to further strongly draw attention of a driver as an observer by such a cooperative display process of the stereoscopic object.

<6. Regarding Auxiliary Information Used when Generating Synthesis Image>

All the above-described embodiments desire a process of generating one synthesis image by synthesizing images captured by a plurality of cameras mounted at different positions.

When the synthesis image is generated, it is necessary to exactly perform positioning of the images captured by the cameras.

For the positioning, positions where the plurality of cameras capturing images are capable of performing image capturing are irradiated with a specific pattern, and then the cameras perform image capturing. It is possible to generate a synthesis image having a small positional deviation by executing positioning using the irradiation patterns included in the images captured by the respective cameras.

A specific configuration example for executing this process will be described with reference to FIG. 27.

Figure 27:
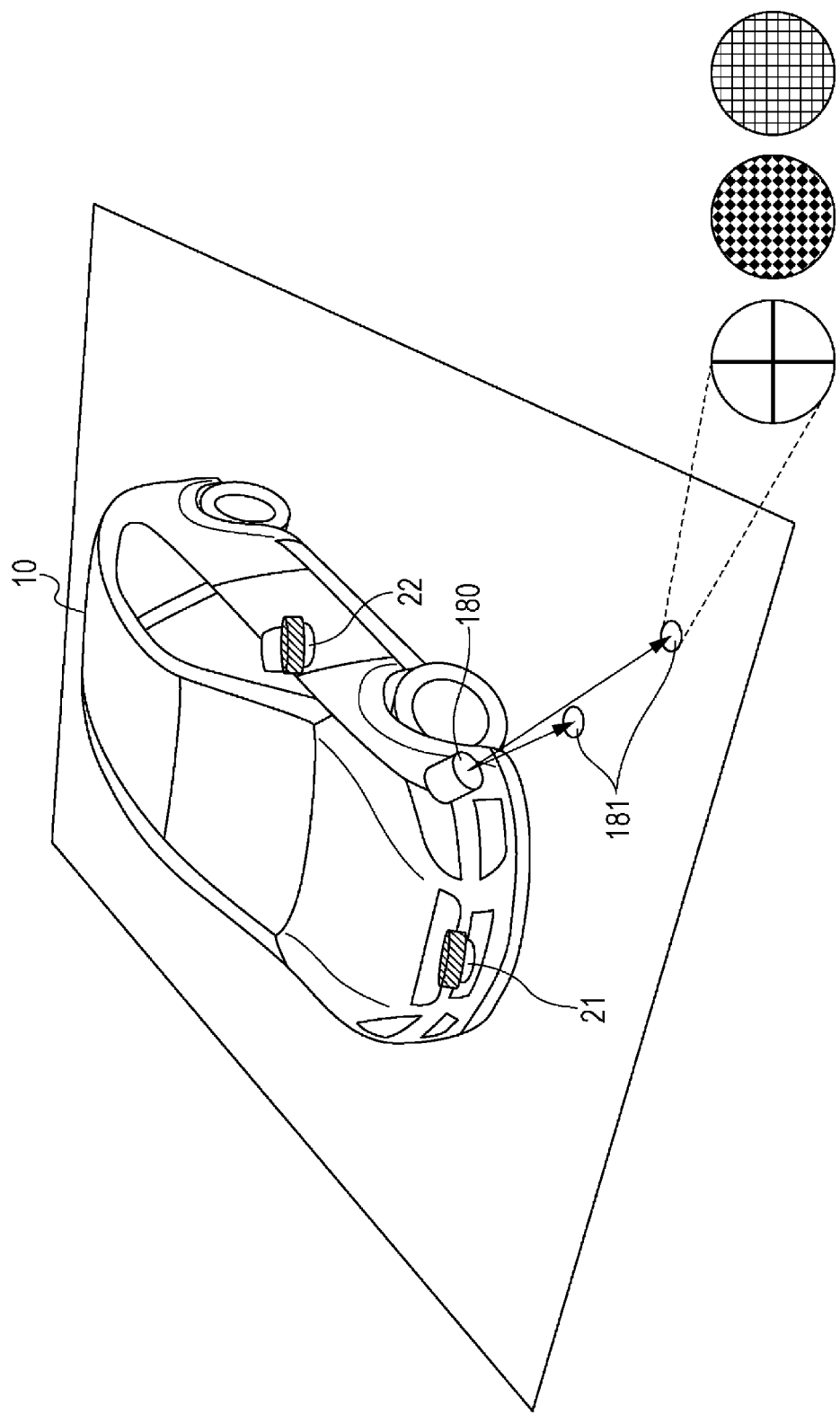
FIG. 27 is a diagram illustrating laser irradiation patterns which are auxiliary information used when generating a synthesis image.

A laser calibration reference pattern irradiation unit 180 shown in FIG. 27 irradiates the ground with a calibration reference pattern 181 having a certain image pattern as shown in the drawing.

The irradiation with the calibration reference pattern 181 is performed on a position where the camera F21 on the front of the vehicle 10 and the camera L22 on the left side of the vehicle 10 are capable of image capturing.

As shown in the drawing, the calibration reference pattern 181 has a specific pattern such as, for example, a cross and a grid-shaped pattern.

Meanwhile, the laser calibration reference pattern irradiation unit 180 is constituted by, for example, a solid laser light source and a pattern generating holographic filter.

The calibration reference pattern 181 is captured in the images captured by the camera F21 on the front of the vehicle 10 and the camera L22 on the left side of the vehicle 10.

When a process is performed of synthesizing an overhead image generated from the image captured by the camera F21 and an overhead image generated from the image captured by the camera L22, irradiation pattern images included in the respective captured images are used.

That is, at the time of generating the synthesis image, described in the above-described embodiments, which has a junction region, positioning is executed so as to set irradiation patterns of two images at the same position on the synthesis image. Thus, it is possible to easily generate the synthesis image having a small positional deviation.

Meanwhile, for example, the laser calibration reference pattern irradiation unit 180 shown in FIG. 27 may be configured to execute irradiation with a calibration reference pattern in accordance with image capturing timings of image capturing frames at which the cameras capture images, rather than to continuously execute laser irradiation. The plurality of cameras perform image capturing in association with an irradiation timing of the calibration reference pattern. An image processing unit detects the calibration reference pattern from differences between a plurality of continuous captured image frames, and executes an image synthesis process in which regions irradiated with the calibration reference pattern are applied to image positioning at the time of generating a synthesis image.

In addition, an image processing apparatus may be configured to execute calibration, as a camera adjustment process to which a captured image including a calibration reference pattern is applied, at fixed intervals or at the time of generating a synthesis image.

<7. Regarding Example of Hardware Configuration of Image Processing Apparatus>

Next, a description will be given of an example of a hardware configuration of an image processing apparatus executing an image display process according to the above-described embodiments.

Figure 28:
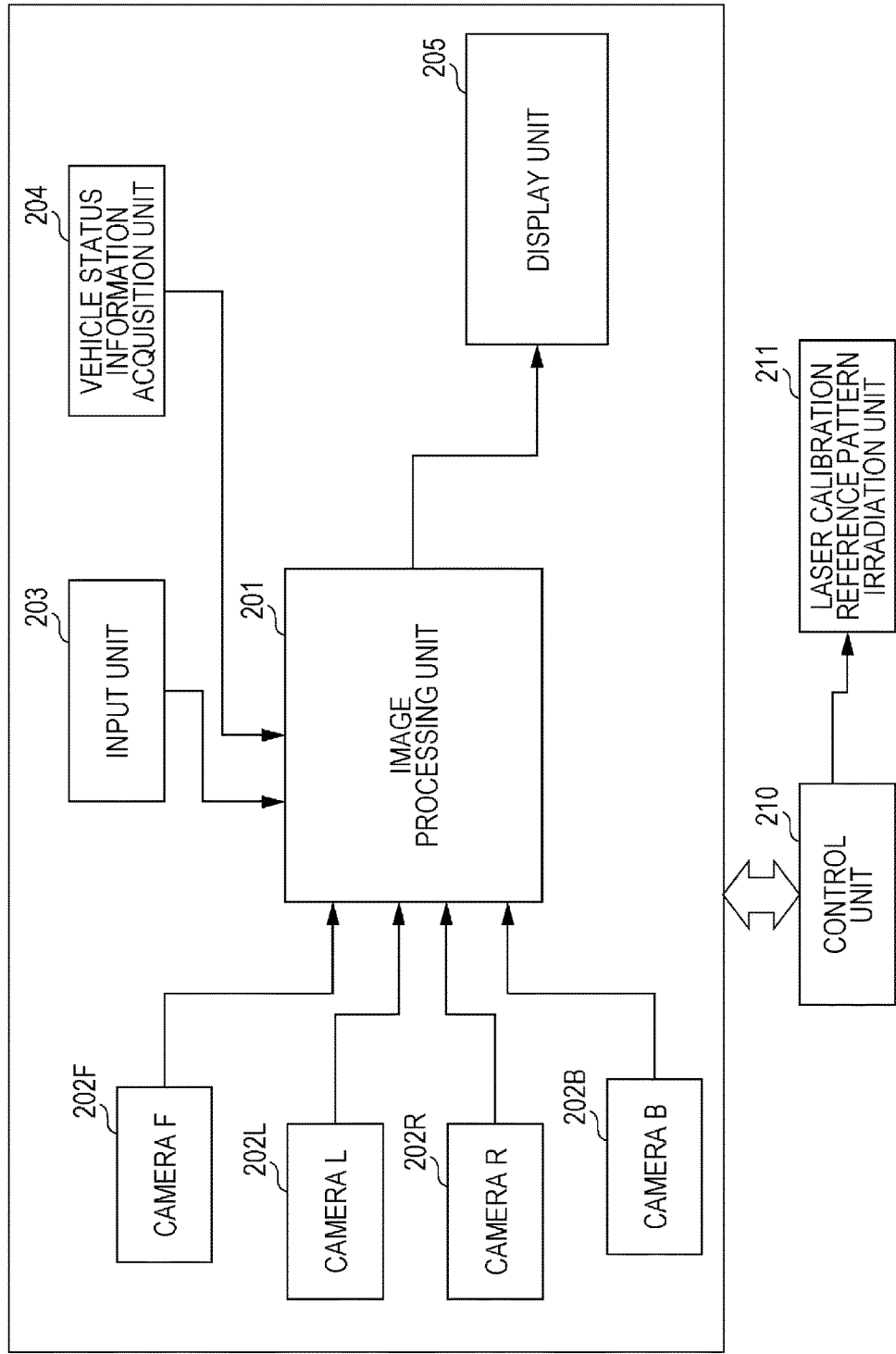
FIG. 28 is a diagram illustrating an example of a hardware configuration of an image processing apparatus of the present disclosure.

FIG. 28 is a diagram showing a configuration example of the entirety of an image processing apparatus including an image processing unit 201 that executes the image display process according to the above-described embodiments and a plurality of cameras that capture images to be processed.

A camera F 202F is equivalent to the camera F21, shown in FIG. 1, which is provided on the front of the vehicle 10.

A camera L 202L is equivalent to the camera L22, shown in FIG. 1, which is provided on the left side of the vehicle 10.

A camera R 202R is equivalent to the camera R23, shown in FIG. 1, which is provided on the right side of the vehicle 10.

A camera B 202B is equivalent to the camera B24, shown in FIG. 1, which is provided on the back of the vehicle 10.

Each of the cameras, which is a camera including a wide-angle lens such as, for example, a fish-eye lens, executes movie capturing at a predetermined frame rate and outputs the captured movie to the image processing unit 201.

The image processing unit 201 inputs images captured by the camera F 202F to the camera B 202B, generates a synthesis image to be displayed on a display unit 205, and outputs the generated synthesis image. The generated synthesis image is an overhead image observed from above centering on a vehicle having, for example, the camera F 202F to the camera B 202B mounted thereon.

The image processing unit 201 generates four overhead images by performing overhead conversion on the respective images captured by the camera F 202F to the camera B 202B, and generates the synthesis image having a junction region of any one pattern of the above-described embodiments and outputs the generated image to the display unit 205.

An input unit 203 is used to input various pieces of setting information by a user. Specifically, the input unit is used for various inputs such as, for example, the switching of an image displayed on the display unit 205 and the setting of a display mode.

The image processing unit 201 performs the switching and control of display information on the display unit 205 in accordance with information input from the input unit 203.

A vehicle status information acquisition unit 204 acquires information on the status of a vehicle, specifically, information such as, for example, the direction, angle, tilt, and height of the vehicle. A vehicle body is tilted on, for example, a hill, and image capturing directions of the respective cameras are also set to directions different from a vertical direction according to the tilt of the vehicle body. Such information is applied to the correction of images captured by the cameras, and thus is input to the image processing unit 201.

A laser calibration reference pattern irradiation unit 211 performs the laser irradiation described above with reference to FIG. 27.

A control unit 210 controls the execution of a process with respect to each component, and controls data input and output between the components.

Meanwhile, the control unit 210 includes a processor having a function of executing a program, and controls a process in accordance with a program stored in a memory not shown in the drawing.

Next, a configuration of the image processing unit 201 and a process performed by the image processing unit will be described in detail with reference to FIG. 29.

Figure 29:
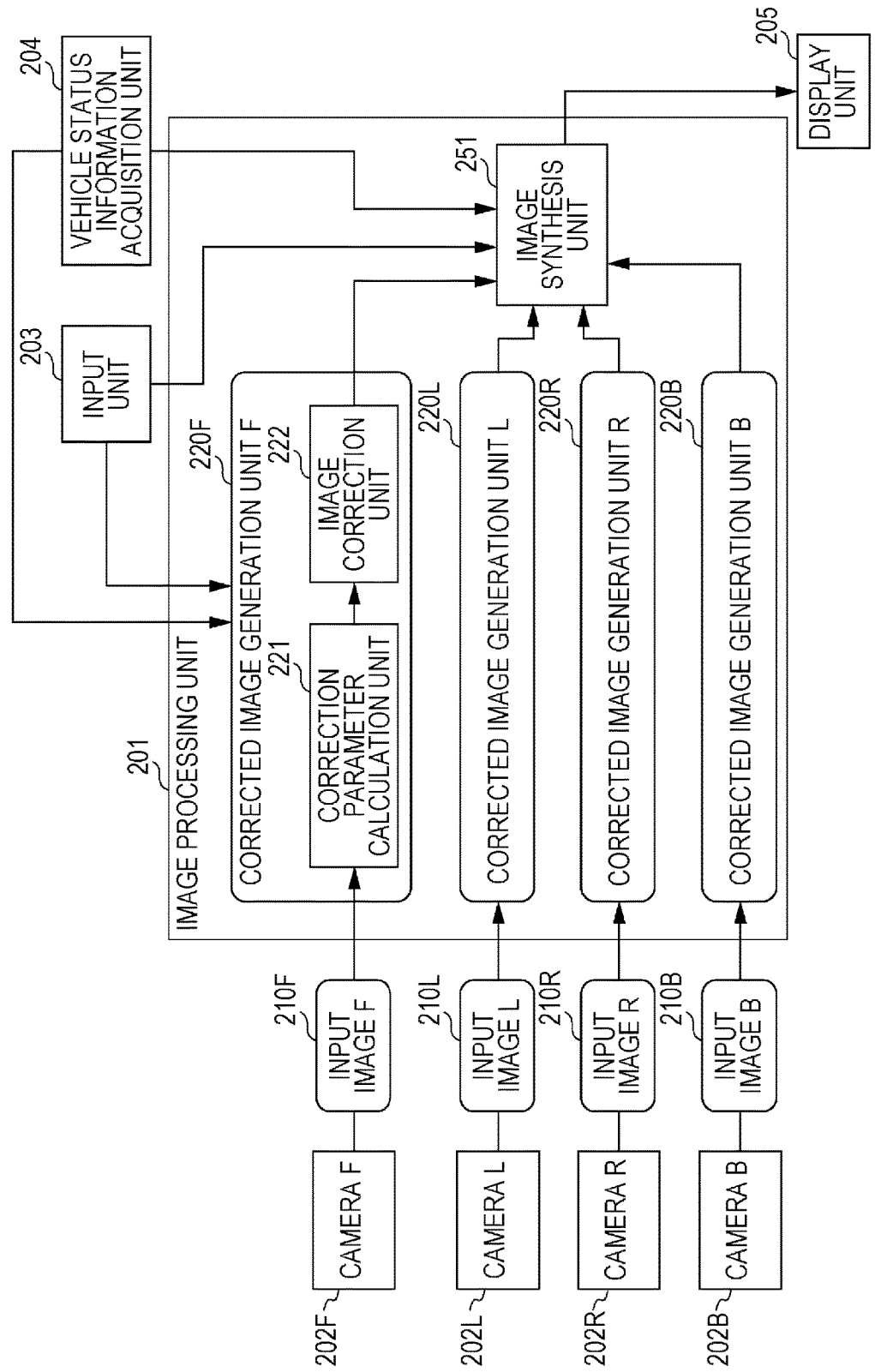
FIG. 29 is a diagram illustrating an example of a hardware configuration of an image processing apparatus of the present disclosure.

As shown in FIG. 29, four images captured by cameras mounted at four different positions of a vehicle are input to the image processing unit 201. That is, an input image F 210F which is an image captured by the camera F 202F provided on the front of the vehicle, an input image L 210L which is an image captured by the camera L 202L provided on the left side of the vehicle, an input image R 210R which is an image captured by the camera R 202R provided on the right side of the vehicle, and an input image B 210B which is an image captured by the camera B 202B provided on the back of the vehicle are input.

Meanwhile, the images are movies captured using a wide-angle lens such as a fish-eye lens.

The image processing unit 201 includes a corrected image generation unit F 220F to a corrected image generation unit B 220B that correct the respective input images and generate overhead images corresponding to the respective images.

The corrected image generation unit F 220F to the corrected image generation unit B 220B have the same configuration and process. In the drawing, the configuration of the corrected image generation unit F 220F, which performs a process for the input image F 210F which is an image captured by the camera F 202F mounted on the front of the vehicle, is shown, and the internal configurations of the other corrected image generation units L 220L to B 220B are omitted.

The configuration and process of the corrected image generation unit F 220F will be representatively described below. The corrected image generation unit F 220F performs a process for the input image F 210F which is an image captured by the camera F 202F mounted on the front of the vehicle.

A correction parameter calculation unit 221 calculates a parameter applied to generate an overhead image from the input image F 210F which is an image captured by a camera including a wide-angle lens.

Meanwhile, the parameter includes a camera internal parameter and a camera external parameter.

The camera internal parameter refers to specific information, such as a focal length of a camera lens, a distortion characteristic of a lens, and a positional error of lens mounting, which is determined independent of the status of a vehicle.

The camera external parameter refers to specific information capable of assuming the fluctuation of a mounting position and direction of a camera, the fluctuation of a vehicle height with respect to a road surface, and the fluctuation depending on driving situations.

In order to perform overhead conversion using a ground as a reference plane from an image captured using a wide-angle lens, it is necessary to correct distortion of an image obtained by capturing the vicinity of a vehicle using a camera and to perform an image correction process of generating an image viewed from above the vehicle which is a viewpoint assumed.

The correction parameter calculation unit 221 calculates a parameter desired for the image correction.

An image correction unit 222 generates an overhead image by performing an image correction process to which the parameter calculated by the correction parameter calculation unit 221 is applied. Meanwhile, the image correction process performed by the image correction unit 222 includes a distortion correction process of removing distortion included in the input image F 210F, a scaling process which is a process of enlarging and reducing an image, and an overhead conversion process accompanied by viewpoint correction of performing conversion to an image viewed from above a vehicle which is an assumed viewpoint.

Meanwhile, information input from the input unit 203 and vehicle status information input from a vehicle status information acquisition unit 204 are input to the correction parameter calculation unit 221 and the image correction unit 222. In addition, parameter calculation and image correction having these pieces of input information applied thereto are performed when necessary.

The image correction unit 222 of the corrected image generation unit F 220F outputs an overhead image generated, that is, an overhead image of the front region of the vehicle which is generated on the basis of the input image F 210F as an image captured by the camera F 202F on the front of the vehicle, to an image synthesizing unit 251.

In addition, the corrected image generation unit L 220L generates an overhead image of the left side region of the vehicle on the basis of the input image L 210L which is an image captured by the camera L 202L on the left side of the vehicle, and outputs the generated image to the image synthesizing unit 251.

In addition, the corrected image generation unit R 220R generates an overhead image of the right side region of the vehicle on the basis of the input image R 210R which is an image captured by the camera R 202R on the right side of the vehicle, and outputs the generated image to the image synthesizing unit 251.

Further, the corrected image generation unit B 220B generates an overhead image of the back region of the vehicle on the basis of the input image B 210B as an image captured by the camera B 202B on the back of the vehicle, and outputs the generated image to the image synthesizing unit 251.

The image synthesizing unit 251 inputs the four overhead images to generate a synthesis image to be displayed on the display unit 205, and outputs the generated image to the display unit 205.

As described above in the embodiments, the image synthesizing unit 251 generates a synthesis image configured such that a junction region between overhead images has a boundary region in which an image to be displayed is changed and moved with a change in time, and outputs the generated image to the display unit 205.

Specifically, for example, the image synthesizing unit generates any one synthesis image having a junction region, in the following synthesis images, that is,
(a) a synthesis image that has the rectangular strip region described above with reference to FIG. 12 and the like, and has a junction region configured such that the rectangular strip region is moved with a change in time,
(b) a synthesis image that has the curved strip region described above with reference to FIG. 20 and the like, and has a junction region configured such that the curved strip region is moved with a change in time, and
(c) a synthesis image that has a junction region configured such that a boundary region of the image, described above with reference to FIG. 24 and the like, alternately repeats the right rotation and the left rotation with a change in time.

Meanwhile, when the image synthesizing unit 251 generates a synthesis image, the laser irradiation pattern described above with reference to FIG. 27 is detected from each image to perform a positioning process to which the detected laser irradiation pattern is applied. It is possible to perform positioning of an image with a high level of accuracy by performing the process.

Meanwhile, the image synthesizing unit 251 may be configured to perform highlighting on an image of a stereoscopic object, which is displayed within a junction region in a synthesis image, so that the image easily draws an observer's attention. This process is the process described above with reference to FIG. 13, FIG. 18, and FIG. 25.

As described above, a difference between pixel values of the positions of the corresponding pixels of images to be joined, for example, the sum of absolute differences (SAD) for performing calculation in units of a plurality of pixels of predetermined unit regions of images can be applied to the detection of a stereoscopic object.

The display unit 205 displays a synthesis image generated by the image synthesizing unit 251.

The synthesis image displayed on the display unit 205 is equivalent to any one synthesis image having a junction region, in the following synthesis images, that is,
(a) a synthesis image that has the rectangular strip region described above with reference to FIG. 12 and the like, and has a junction region configured such that the rectangular strip region is moved with a change in time,
(b) a synthesis image that has the curved strip region described above with reference to FIG. 20 and the like, and has a junction region configured such that the curved strip region is moved with a change in time, and
(c) a synthesis image that has a junction region configured such that a boundary region of the image, described above with reference to FIG. 24 and the like, alternately repeats the right rotation and the left rotation with a change in time.

Any one synthesis image, having a junction region, of the synthesis images (a) to (c) described above is displayed on the display unit 205.

According to the display process, it is possible to reliably display a stereoscopic object which is present in a junction region without causing the stereoscopic object to disappear. Thus, it is possible to cause an observer (driver) to recognize the presence of the stereoscopic object, and to prompt the observer to drive more safely.

<8. Conclusion of Configuration of the Present Disclosure>

The detailed description has been given so far of the embodiment of the present disclosure with reference to a specific embodiment. However, it is obvious that those skilled in the art can make modifications and replacements of the embodiment without departing from the scope of the present disclosure. That is, the present disclosure is described herein for illustrative purposes only and should not be exclusively understood. In order to determine a scope of the present disclosure, appended claims should be taken into consideration.

Meanwhile, a technique disclosed in this specification can adopt the following configurations.

(1) An image processing apparatus comprising: circuitry configured to receive first image data from a first image capture device of an area adjacent to an automobile; receive second image data from a second image capture device of at least a portion of the area adjacent to the automobile; combine the first image data with the second image data to form composite image data of a junction region of the at least a portion of the area adjacent to the automobile; and change over time respective image areas taken from the first image capture device and second image capture device to form the composite image data of the junction region.

(2) The image processing apparatus of (1), wherein the first image data from the first image capture device is from a first perspective with respect to the automobile, the second image data from the second image capture device is from a second perspective with respect to the automobile, and the composite image data of the junction region provides at least a portion of an overhead view of the automobile.

(3) The image processing apparatus of (1), wherein the junction region is at respective field of view edges of the first image capture device and the second image capture device.

(4) The image processing apparatus of (1), wherein the circuitry is configured to take an image area from the first image capture device in a strip shape having a plurality of strips, and the circuitry is configured to change a position of at least one of the plurality of strips over time.

(5) The image processing apparatus of (4), wherein the circuitry combines the first image data with the second image data to form a synthesis image that includes an observable a stereoscopic object when located in the junction region.

(6) The image processing apparatus of (4), wherein an image of the second image data includes strips that are interleaved with the plurality of strips of the first image data.

(7) The image processing apparatus of (6), wherein the circuitry is configured to form a portion of the composite image by identifying a predetermined number of lines from the first image as a first strip having a predetermined width, and append another predetermined number of lines from the second image having another predetermined width.

(8) The image processing apparatus of (7), wherein the circuitry is configured to change the position of at least one of the strips over time by shifting lines of the first image and the second image in another image frame.

(9) The image processing device of (7), wherein the circuitry is configured to adjust a position of the at least one of the strips over time as a function of strip width specification value Ws, strip interval specification value Wf, and/or strip number specification value ZN.

(10) The image processing device of (4), wherein the circuitry is configured to change a pattern of the strip shape.

(11) The image processing apparatus of (5), wherein the circuitry is configured to form the synthesis image with the stereoscopic object being highlighted by at least one of changed color, changed brightness, and blinked on and off in successive frames.

(12) The image processing apparatus of (4), wherein the plurality of strips in the strip shape are arranged rectangularly in the junction region.

(13) The image processing apparatus of (4), wherein the plurality of strips in the strip shape are arranged as curves in the junction region.

(14) The image processing apparatus of (4), wherein the plurality of strips in the strip shape are arranged in a fan-shape in the junction region.

(15) The image processing apparatus of (3), wherein the circuitry is configured to change the respective field of view edges of the first image capture device and the second image capture device as a function of time.

(16) An automobile image processing system comprising: a first image capture device mounted to a front of an automobile and configured to capture first image data with a forward looking perspective with respect to a driver seat in the automobile; a second image device mounted to a side of the automobile and configured to capture second image data with a side looking perspective with respect to the driver seat in the automobile, and circuitry configured to receive the first image data, receive the second image data, combine the first image data with the second image data to form composite image data of a junction region between the first image data and the second image data, and change over time respective image areas taken from the first image capture device and second image capture device to form the composite image data of the junction region, wherein the composite image data of the junction region provides at least a portion of an overhead view of the automobile.

(17) The image processing apparatus of (16), further comprising: a laser calibration reference pattern irradiation generator mounted to the automobile and configured to produce a calibration reference pattern in the junction region, wherein the circuitry is configured to self-calibrate by detecting the calibration reference pattern and making image processing adjustments until the composite image data produces a replica of the calibration reference pattern within a predetermined tolerance of the calibration reference pattern produced by the laser calibration reference pattern irradiation generator.

(18) A vehicle monitoring system comprising: a first image capture device mounted to a front of the automobile and configured to capture first image data with a forward looking perspective with respect to a driver seat in the automobile; a second image device mounted to a side of the automobile and configured to capture second image data with a side looking perspective with respect to the driver seat in the automobile; circuitry configured to receive the first image data, receive the second image data, combine the first image data with the second image data to form composite image data of a junction region between the first image data and the second image data, and change over time respective image areas taken from the first image capture device and second image capture device to form the composite image data of the junction region, wherein the composite image data of the junction region provides at least a portion of an overhead view of the automobile; and a display that is mounted to an interior of the automobile and is configured to display the overhead view of the automobile including the junction region.

(19) The vehicle monitoring system of (18), wherein the circuitry is further configured to include a simulated image of a top of the automobile in the overhead view that is displayed on the display.

(20) The vehicle monitoring system of (18), wherein the circuitry is configured to include in the overhead view an image of a stereoscopic object that is captured in the junction region by the first image capture device and the second image capture device.

(A01) An image processing apparatus including:
an image processing unit that generates a plurality of overhead images by individually correcting images captured by a plurality of cameras disposed at different positions, and generates a synthesis image by joining the plurality of generated overhead images to each other,
wherein the image processing unit generates a synthesis image having a junction region which is set such that display regions of the plurality of overhead images to be joined change with a change in time.

(A02) The image processing apparatus according to (A01) described above, wherein the image processing unit alternately sets a first image and a second image, which are to be joined to each other, in a strip shape, and generates a synthesis image having a junction region which is set such that a strip position changes with a change in time.

(A03) The image processing apparatus according to (A02) described above, wherein the image processing unit alternately sets the first image and the second image, which are to be joined to each other, in a rectangular or curved strip shape.

(A04) The image processing apparatus according to (A02) or (A03), wherein the image processing unit sets strip widths of the first image and the second image, which are to be joined to each other, to different widths.

(A05) The image processing apparatus according to any one of (A01) to (A04) described above, wherein the image processing unit generates a synthesis image having a junction region which is set such that a boundary position between the first image and the second image, which are to be joined to each other, changes with a change in time.

(A06) The image processing apparatus according to (A05) described above, wherein the image processing unit generates a synthesis image having a junction region which is set such that a right rotation and a left rotation of the boundary position between the first image and the second image, which are to be joined to each other, are repeated centering on a predetermined point.

(A07) The image processing apparatus according to (A06) described above, wherein the image processing unit generates a synthesis image having a junction region which is set such that the right rotation and the left rotation of the boundary position have different speeds.

(A08) The image processing apparatus according to any one of (A01) to (A07) described above, wherein when a stereoscopic object is included in display information of the junction region, the image processing unit generates a synthesis image in which the stereoscopic object is partially or entirely highlighted.

(A09) The image processing apparatus according to (A08) described above, wherein the highlighting is a blinking display or a process of changing and displaying at least one of brightness and color.

(A10) The image processing apparatus according to (A09) described above, wherein the image processing unit detects a stereoscopic object by applying a sum of absolute differences (SAD) of pixel values in units of predetermined regions of a plurality of images to be joined to each other in the junction region.

(A11) The image processing apparatus according to any one of (A01) to (A10) described above, wherein the image processing apparatus includes a calibration reference pattern irradiation unit that irradiates an image capturing region of the camera with a calibration reference pattern having a specific pattern, wherein the plurality of cameras generate captured images including a calibration reference pattern irradiation region, and wherein the image processing unit performs an image synthesis process in which the calibration reference pattern irradiation region is applied to image positioning at the time of generating the synthesis image.

(A12) The image processing apparatus according to (A11) described above, wherein the calibration reference pattern irradiation unit of the image processing unit is constituted by a solid laser light source and a pattern generating holographic filter.

(A13) The image processing apparatus according to any one of (A01) to (A12) described above, wherein the image processing apparatus includes a calibration reference pattern irradiation unit that irradiates an image capturing region with a calibration reference pattern in accordance with image capturing timings of frames captured by the cameras, wherein the plurality of cameras captures images in association with an irradiation timing of the calibration reference pattern, and wherein the image processing unit detects the calibration reference pattern from a difference between a plurality of continuous captured image frames, and performs an image synthesis process in which the calibration reference pattern irradiation region is applied to image positioning at the time of generating the synthesis image.

(A14) The image processing apparatus according to any one of (A01) to (A13) described above, wherein the image processing apparatus performs calibration, as a camera adjustment process to which a captured image including the calibration reference pattern is applied, at fixed intervals or at the time of generating the synthesis image.

(A15) The image processing apparatus according to any one of (A01) to (A14) described above, wherein the cameras are disposed on front, back, right, and left sides of a vehicle, and wherein the image processing unit generates an overhead image, as the synthesis image, in which a surrounding region of the vehicle is observed from above the vehicle.

(A16) The image processing apparatus according to (A15) described above, wherein the camera includes a wide-angle lens.

(A17) An image processing method which is performed in an image processing apparatus, the method including:
causing an image processing unit to generate a plurality of overhead images by individually correcting images captured by a plurality of cameras disposed at different positions, and
generating a synthesis image by joining the plurality of generated overhead images to each other,
wherein in the generating of synthesis image, the image processing unit generates a synthesis image having a junction region which is set such that display regions of the plurality of overhead images to be joined change with a change in time.

(A18) A program causing an image processing apparatus to perform image processing, the processing including:
causing an image processing unit to generate a plurality of overhead images by individually correcting images captured by a plurality of cameras disposed at different positions, and
generating a synthesis image by joining the plurality of generated overhead images to each other; and
causing a synthesis image having a junction region, which is set such that display regions of the plurality of overhead images to be joined change with a change in time, to be generated in the generating of the synthesis image.

In addition, the series of processing described herein can be executed by hardware, software, or a combined configuration of both. When the processing is executed by software, the program with a processing sequence recorded therein can be installed in a memory within a computer embedded in dedicated hardware and executed, or a program can be installed in a general-purpose computer which can execute various pieces of processing and execution. The program can be recorded in advance in a recording medium, for example. The program can not only be installed from the recording medium to the computer but can also be received via a network such as a local area network (LAN) or the Internet and installed in a recording medium such as a built-in hard disk.

Meanwhile, the various pieces of processing described herein may be executed in a time series in an order of the description or may be executed in parallel or individual manner depending on a processing capability of a device which executes the processing or depending on necessity. In addition, the term "system" used in this specification is a logical complex configuration of a plurality of devices, and devices with various configurations are not necessarily provided in the same housing.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

As described above, according to an embodiment of the present disclosure, it is possible to generate an image, it is possible to generate and display an image viewed from above a vehicle, the image making it easy to recognize a stereoscopic object.

Specifically, a plurality of overhead images are generated by individually correcting images captured by a plurality of cameras disposed at different positions of a vehicle such as front, back, right, and left sides, and a synthesis image is generated by joining the plurality of generated overhead images to each other. An image processing unit generates a synthesis image having a junction region which is set such that display regions of a plurality of overhead images to be joined change with a change in time. For example, a first image and a second image, which are to be joined, are alternately set in a strip shape, and a synthesis image is generated having a junction region which is set such that the position of a strip changes with a change in time.

With this configuration, when a stereoscopic object is present in an adjacent image synthesis range, an image having a boundary portion of a dynamic body is displayed as an image to be displayed. As a result, it is possible to generate and display an image viewed from above a vehicle, the image making it easy to recognize a stereoscopic object by stimulating a human dynamic body sensory nerve.

REFERENCE SIGNS LIST

10 Vehicle
21 To 24 Camera
30 Wide-angle camera
31 Subject
32 Stereoscopic object
70 Synthesis image
101 Front image
102 Left side image
103 Junction region
111 Stereoscopic object within front image
112 Stereoscopic object within left side image
161 Image boundary
171 Stereoscopic object within front image
172 Stereoscopic object within left side image
180 Laser calibration reference pattern irradiation unit
181 Calibration reference pattern
201 Image processing unit
202 Camera
203 Input unit
204 Vehicle status information acquisition unit
205 Display unit
210 Control unit
211 Laser calibration reference pattern irradiation unit
210 Input image
220 Corrected image generation unit
221 Correction parameter calculation unit
222 Image correction unit
251 Image synthesizing unit

The invention claimed is:

1. An image processing system for an automotive camera system comprising:
circuitry configured to
generate a plurality of bird-eye-view images from a corrected first image and a corrected second image, received from a first image capture device and a second image capture device,
generate a synthesis image based on the plurality of bird-eye-view images, wherein
the synthesis image comprises a plurality of first strip regions that are a part of the corrected first image and a plurality of second strip regions that are a part of the corrected second image,
the first strip regions and the second strip regions are alternately positioned in the synthesis image, and
the locations of the first strip regions and the second strip regions are changed over time,
the circuitry being further configured to
change a shape pattern of the strip regions, and
display the synthesis image on a display within an automobile, the synthesis image being used to navigate movement of the automobile away from an obstacle.

2. The image processing system of claim 1, wherein the circuitry is further configured to combine first image data with second image data to form a synthesis image that includes an observable stereoscopic object when located in a junction region between the corrected first image and the corrected second image.

3. The image processing system of claim 1, wherein the circuitry is further configured to adjust a position of at least one of the strip regions over time as a function of a strip width specification value Ws, a strip interval specification value Wf, and/or a strip number specification value Zn.

4. The image processing system of claim 2, wherein the circuitry is further configured to form the synthesis image with the stereoscopic object being highlighted by at least one of a changed color, a changed brightness, and blinked on and off in successive frames.

5. The image processing system of claim 2, wherein the plurality of strips in the strip regions are arranged rectangularly in the junction region.

6. The image processing system of claim 2, wherein the plurality of strips in the strip regions are arranged as curves in the junction region.

7. The image processing system of claim 2, wherein the plurality of strips in the strip regions are arranged in a fan-shape in the junction region.

8. The image processing system of claim 1, further comprising a first camera as the first image capture device.

9. An image processing method for an automotive camera system comprising:
generating a plurality of bird-eye-view images from a corrected first image and a corrected second image, received from a first image capture device and a second image capture device;
generating a synthesis image based on the plurality of bird-eye-view images,
the synthesis image comprising a plurality of first strip regions that are a part of the corrected first image and a plurality of second strip regions that are a part of the corrected second image,
the first strip regions and the second strip regions being alternately positioned in the synthesis image,
the locations of the first strip regions and the second strip regions being changed over time;
changing a shape pattern of the strip regions; and
displaying the synthesis image on a display within an automobile, the synthesis image being used to navigate movement of the automobile away from an obstacle.

10. The image processing method of claim 9, further comprising:
combining first image data with second image data to form a synthesis image that includes an observable stereoscopic object when located in a junction region between the corrected first image and the corrected second image.

11. The image processing method of claim 9, further comprising:

adjusting a position of at least one of the strip regions over time as a function of a strip width specification value Ws, a strip interval specification value Wf, and/or a strip number specification value Zn.

12. The image processing method of claim 10, further comprising:

forming the synthesis image with the stereoscopic object being highlighted by at least one of a changed color, a changed brightness, and blinked on and off in successive frames.

13. The image processing method of claim 10, further comprising:

arranging the plurality of strips in the strip regions rectangularly in the junction region.

14. The image processing method of claim 10, further comprising:

arranging the plurality of strips in the strip regions as curves in the junction region.

15. The image processing method of claim 10, further comprising:

arranging the plurality of strips in the strip regions in a fan-shape in the junction region.

16. The image processing method of claim 9, further comprising:

capturing the first image.

\* \* \* \* \*